(12) United States Patent
Kang et al.

(10) Patent No.: US 12,351,671 B2
(45) Date of Patent: Jul. 8, 2025

(54) POLYOLEFIN CATALYST COMPONENT CONTAINING MESOPOROUS MATERIAL, PREPARATION METHOD THEREFOR AND USE THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Yu Kang, Beijing (CN); Xinping Lyu, Beijing (CN); Dongbing Liu, Beijing (CN); Zifang Guo, Beijing (CN); Hongmei Liu, Beijing (CN); Shiyuan Xu, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 896 days.

(21) Appl. No.: 17/288,071

(22) PCT Filed: Oct. 25, 2019

(86) PCT No.: PCT/CN2019/113373
§ 371 (c)(1),
(2) Date: Apr. 23, 2021

(87) PCT Pub. No.: WO2020/083386
PCT Pub. Date: Apr. 30, 2020

(65) Prior Publication Data
US 2021/0380730 A1 Dec. 9, 2021

(30) Foreign Application Priority Data

Oct. 26, 2018 (CN) .......................... 201811261730.1
Oct. 26, 2018 (CN) .......................... 201811261755.1
(Continued)

(51) Int. Cl.
*C08F 110/02* (2006.01)
*C08F 4/02* (2006.01)
*C08F 4/642* (2006.01)

(52) U.S. Cl.
CPC .......... *C08F 4/6421* (2013.01); *C08F 4/6425* (2013.01); *C08F 110/02* (2013.01); *C08F 4/027* (2013.01); *C08F 2410/06* (2021.01)

(58) Field of Classification Search
CPC .............................. C08F 110/02; C08F 4/025
See application file for complete search history.

(56) References Cited

U.S. PATENT DOCUMENTS 4,293,673 A 10/1981 Hamer et al.
4,302,565 A 11/1981 Goeke et al.
(Continued)

FOREIGN PATENT DOCUMENTS

CN 102040688 A 5/2011
CN 102049300 A 5/2011
(Continued)

OTHER PUBLICATIONS

CN 102731687 machine translation. (Year: 2012).*
(Continued)

*Primary Examiner* — Catherine S Branch
(74) *Attorney, Agent, or Firm* — FINNEGAN, HENDERSON, FARABOW, GARRETT & DUNNER LLP

(57) ABSTRACT

The invention relates to the technical field of heterogeneous catalytic olefin polymerization, and discloses a polyolefin
(Continued)

catalyst, its preparation and its us. A method for preparing the polyolefin catalyst comprises: (i) providing a thermally activated mesoporous material, with the thermal activation treatment being performed at a temperature of 300 to 900° C. for a period of time of 3 to 48 hours; (ii) under an inert atmosphere, (iia) conducting impregnation treatment of the thermally activated mesoporous material with a solution containing a magnesium component and then with a solution containing a titanium component, (iib) conducting impregnation treatment of the thermally activated mesoporous material with a solution containing a titanium component and then with a solution containing a magnesium component, or (iic) conducting co-impregnation treatment of the thermally activated mesoporous material with a solution containing both a titanium component and a magnesium component, to obtain a slurry to be sprayed; and (iii) spray drying the slurry to be sprayed from step (ii), to obtain a solid polyolefin catalyst component. When used in olefin polymerization, the polyolefin catalysts prepared by using the method provided by the invention have high catalytic activities, and polyolefin products having a narrow molecular weight distribution and an excellent melt index can be obtained.

20 Claims, 7 Drawing Sheets

(30) Foreign Application Priority Data

Nov. 30, 2018 (CN) ........................ 201811457344.X
Nov. 30, 2018 (CN) ......................... 201811459565.0

(56) References Cited

U.S. PATENT DOCUMENTS

| | | | |
|---|---|---|---|
| 4,302,566 A | 11/1981 | Karol et al. | |
| 4,303,771 A | 12/1981 | Wagner et al. | |
| 5,290,745 A | 3/1994 | Jorgensen et al. | |

FOREIGN PATENT DOCUMENTS

| | | | |
|---|---|---|---|
| CN | 102451760 A | | 5/2012 |
| CN | 102453143 A | | 5/2012 |
| CN | 102476803 A | | 5/2012 |
| CN | 102731687 A | | 10/2012 |
| CN | 102952209 A | | 3/2013 |
| CN | 102952213 A | | 3/2013 |
| CN | 102952217 A | | 3/2013 |
| CN | 102952218 A | | 3/2013 |
| CN | 102992341 A | | 3/2013 |
| CN | 103586079 A | | 2/2014 |
| CN | 103816933 A | | 5/2014 |
| CN | 104250322 A | | 12/2014 |
| CN | 103349923 B | | 7/2015 |
| CN | 105749976 A | | 7/2016 |
| CN | 107417824 A | | 12/2017 |
| CN | 107417831 A | | 12/2017 |
| CN | 107840913 A | | 3/2018 |
| CN | 109382130 A | | 2/2019 |
| CN | 109382132 A | | 2/2019 |
| CN | 110496618 A | | 11/2019 |
| CN | 110496635 A | | 11/2019 |
| EA | 200800518 A1 | | 8/2008 |
| EP | 0835887 | | 4/1998 |
| EP | 1205493 | | 5/2002 |
| JP | 2017165623 A | * | 9/2017 |
| RU | 2178421 C2 | | 1/2002 |
| WO | WO2016195870 A1 | | 12/2016 |

OTHER PUBLICATIONS

JP 2017-165623 machine translation. (Year: 2017).*
Zhang, J., Effect of Spray Drying Molding Conditions on Catalyst Performance, *Catalyst Preparation Process Technology*, Jun. 2004, Cover and pp. 228-233, ISBN: 7-80164-568-5, China Petrochemical Press, Beijing, China.
Yu, Chengzhong et al., Nonionic Block Copolymer Synthesis of Large-Pore Cubic Mesoporous Single Crystals by Use of Inorganic Salts, *Journal of the American Chemical Society*, vol. 124, No. 17, Apr. 2, 2002 (Apr. 2, 2002), ISSN: 0002-7863, pp. 4556 and 4557.
Zhao Qilong et al., Research Progress of Mesoporous Molecular Sieve SBA-15, *Guangzhou Chemical Industry*, vol. 33, Feb. 28, 2005, pp. 12-15.
International Search Report for International Application No. PCT/CN2019/113373, dated Jan. 19, 2020.

* cited by examiner

POLYOLEFIN CATALYST COMPONENT CONTAINING MESOPOROUS MATERIAL, PREPARATION METHOD THEREFOR AND USE THEREOF

CROSS-REFERENCE TO RELATED APPLICATIONS

This application is a national stage filing under 35 U.S.C. § 371 of International Application No. PCT/CN2019/113373, filed Oct. 25, 2019, and claims the priority benefit of Chinese Patent Application No. 201811261730.1, filed Oct. 26, 2018, Chinese Patent Application No. 201811261755.1, filed Oct. 26, 2018, Chinese Patent Application No. 201811457344.X, filed Nov. 30, 2018, and Chinese Patent Application No. 201811459565.0, filed Nov. 30, 2018, which are incorporated herein by reference in their entireties.

TECHNICAL FIELD

The invention relates to the technical field of heterogeneous catalytic olefin polymerization. Specifically, the present invention relates to a method of preparing a polyolefin catalyst component, a polyolefin catalyst component prepared by the method, and use of the polyolefin catalyst component prepared by the method in the polymerization of an olefin monomer. More specifically, the present invention relates to a mesoporous material-containing polyolefin catalyst component, its preparation method and application.

BACKGROUND ART

At present, Ti and Mg based Ziegler-Natta catalyst systems are widely used in ethylene polymerization or copolymerization of ethylene and α-olefin. A lot of researches are still conducted with a desire, on the one hand, that the resultant catalyst has a sufficiently high polymerization activity so that the catalyst has a high efficiency in the plant and leaves residues as little as possible in the polymer, and with a desire, on the other hand, that the resultant polymer has a uniform particle size distribution, with the particle morphology of the polymer being as spherical as possible, and the content of polymer fines is small, in order to facilitate long-period continuous running of industrial plant. In order to obtain a good particle morphology, technicians often use a supporting method to prepare the catalyst, for example, impregnating a catalytically active component on a particulate carrier material, such as a porous inorganic carrier material such as silica or an organic particulate carrier material. For example, U.S. Pat. Nos. 4,293,673, 4,303,771, 4,302,565, 4,302,566, and EP0835887A2 each discloses the supporting of a magnesium compound and a titanium compound on an inorganic carrier to prepare a catalyst. In such a method, the morphology of the carrier will determine the morphology of the final catalyst, and therefore such a method applies high requirements on the morphology and surface properties of the carrier, resulting in increased catalyst preparation costs. In addition, a disadvantage of the supported catalyst is that the impregnation step may result in uneven loading of the active components on the surface of the carrier, and at the same time, the loading amount is limited due to the limitation of the specific surface area of the carrier so that the enhancement of the catalyst activity is limited.

U.S. Pat. No. 5,290,745 discloses a method for preparing a catalyst component suitable for producing ethylene copolymers, in which a solution of titanium trichloride component and magnesium dichloride in an electron donor solvent is combined with a solid particulate filler such as fumed silica, and the resulting slurry is spray dried to provide a solid catalyst component.

Although a large number of literatures disclose the use of porous inorganic oxide materials in the preparation of polyolefin catalyst components, the prior art does not disclose the use of mesoporous materials such as silicon-based mesoporous materials in the preparation of polyolefin catalyst components.

There is still a need to provide polyolefin catalyst components having high catalytic activity and good particle morphology.

SUMMARY OF THE INVENTION

In order to overcome the problems suffered by the prior art, the inventors conducted diligently research. As a result, it has been found that the use of mesoporous materials, such as silicon-based mesoporous materials, with a high specific surface area and a relatively narrow pore size distribution as a carrier (or filler), and through an optimized preparation method, can provide a polyolefin catalyst component exhibiting desired performance, especially high catalytic activity, and the present invention has been made thereby.

Thus, an object of the present invention is to provide a thermally activated mesoporous material, wherein the thermal activation treatment on the mesoporous material is performed under an inert atmosphere at a temperature of 300 to 900° C. for a period of time of 3 to 48 hours.

Another object of the present invention is to provide a method for preparing a polyolefin catalyst component, comprising the steps of:
  (i) providing a thermally activated mesoporous material carrier, wherein the thermal activation treatment on the mesoporous material is performed under an inert atmosphere at a temperature of 300 to 900° C. for a period of time of 3 to 48 hours;
  (ii) under an inert atmosphere, (iia) conducting impregnation treatment of the thermally activated mesoporous material carrier with a solution containing a magnesium component and then with a solution containing a titanium component, (iib) conducting impregnation treatment of the thermally activated mesoporous material carrier with a solution containing a titanium component and then with a solution containing a magnesium component, or (iic) conducting co-impregnation treatment of the thermally activated mesoporous material carrier with a solution containing both a titanium component and a magnesium component, to obtain a slurry to be sprayed; and
  (iii) spray drying the slurry to be sprayed from step (ii), to obtain a solid polyolefin catalyst component.

Yet another object of the present invention is to provide a polyolefin catalyst component, which comprises a thermally activated mesoporous material carrier and, supported thereon, a magnesium component, a titanium component and an optional electron donor component.

Still another object of the present invention is to provide a method for polymerizing an olefin comprising: a) polymerizing an olefin monomer under polymerization conditions in the presence of the polyolefin catalyst component according to the present invention and a cocatalyst, to provide a polyolefin; and b) recovering the polyolefin.

The inventors have found in the research that using a mesoporous material as a carrier of polyolefin catalyst component and preparing the polyolefin catalyst component through an optimized method can effectively increase the loading amount of an active component of the catalyst component, thereby enhancing the catalytic activity of the resulting polyolefin catalyst component, and the molecular weight distribution and melt index of the polyolefin product obtained when the polyolefin catalyst component is used in an olefin polymerization reaction are further improved, and the obtained polyolefin product powder is of spherical shape and has a uniform particle size.

In addition, the method for preparing polyolefin catalyst component of the present invention can directly obtain the spherical polyolefin catalyst component in one step by spray drying process, and the operation is simple. The resultant spherical polyolefin catalyst component has a stable particle structure and a high strength so that it is not easily broken, and the particle size is easy to adjust, the particle size distribution is uniform, the particle size distribution curve is narrow, and the flowability is good.

Other features and advantages of the present invention will be described in detail below.

BRIEF DESCRIPTION OF THE DRAWINGS

The drawings are to provide a further understanding to the invention, and constitute a part of the specification, together with the following specific embodiments, to explain the invention, but do not constitute a limitation to the invention. In the drawings.

DESCRIPTION OF PREFERRED EMBODIMENTS

Figure 1:
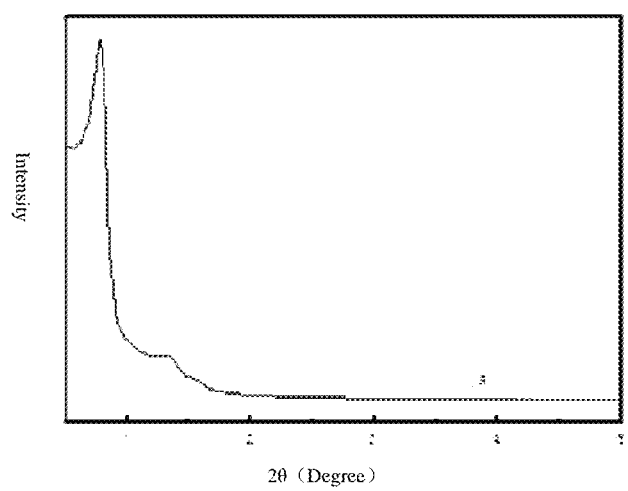
FIG. 1 is an XRD spectrum of the eggshell-like mesoporous material A1 of Example 1.

The endpoints and any values of the ranges disclosed herein are not limited to the precise ranges or values, and these ranges or values should be understood to include values close to these ranges or values. For numerical ranges, combinations can be made between the individual endpoints of the ranges, between the individual endpoints of the ranges and the individual point values between them, and between the individual point values, to obtain one or more new numerical ranges, which should be considered as being specifically disclosed herein.

As used herein, the term "mesoporous material" refers to a class of porous materials with a pore size between 2 and 50 nm. The mesoporous materials generally have an extremely high specific surface area, regular and ordered channel structure and narrow pore size distribution. The mesoporous materials preferably have an average pore diameter of about 2 to about 30 nm, more preferably about 2 to about 20 nm.

As used herein, the term "polymerization" encompasses homopolymerization and copolymerization. As used herein, the term "polymer" encompasses homopolymers, copolymers and terpolymers.

As used herein, the term "catalyst component" intends to mean main catalyst component or procatalyst, which, together with a conventional cocatalyst such as an alkyl aluminum compound and an optional external electron donor, constitutes a catalyst for olefin polymerization.

As used herein, the term "halogen" refers to fluorine, chlorine, bromine and iodine.

Herein, unless otherwise specified, the average particle size of a material is measured by using a laser particle size distribution analyzer, and the specific surface area, pore volume, and average pore size are measured through nitrogen adsorption method. Herein, unless otherwise specified, the particle size refers to the particle size of a particulate material, wherein the particle size is expressed by the diameter of a sphere when the particulate material is in a sphere form, by the side length of a cube when the particulate material is in a cube form, and by the mesh size of the sieve that is just able to screen out the particulate material when the particulate material is of an irregular shape.

In a first aspect, the present invention provides a thermally activated mesoporous material, wherein the thermal activation treatment on the mesoporous material is performed under an inert atmosphere at a temperature of 300 to 900° C. for a period of time of 3 to 48 hours. As mentioned above, the thermally activated mesoporous material according to the present invention is suitable for the preparation of olefin polymerization catalyst components to provide novel olefin polymerization catalyst components with desired properties.

The thermally activated mesoporous material of the invention may be obtained by thermally activating a mesoporous material. In principle, there are no particular limitations on the mesoporous materials that can be used in the invention. However, the mesoporous material is preferably a mesoporous silica particulate material. In some embodiments, the mesoporous material prior to the thermal activation treatment is selected from the group consisting of:

a) a mesoporous material with a two-dimensional hexagonal channel structure, having an average pore size of from 4 to 15 nm, a specific surface area of from 550 to 650 m$^2$/g, a pore volume of from 0.5 to 1.5 mL/g, and an average particle size of from 0.5 to 15 μm;

b) an eggshell-like mesoporous material with a two-dimensional hexagonal channel structure, having a pore volume of from 0.5 to 1.5 mL/g, a specific surface area of from 100 to 500 m$^2$/g, an average pore size of from 5 to 15 nm, and an average particle size of from 3 to 20 μm;

c) a spherical mesoporous silica with a body-centered cubic structure, having an average particle size of from 2 to 9 μm, a specific surface area of from 700 to 900 m$^2$/g, a pore volume of from 0.5 to 1 mL/g, and an average pore size of from 1 to 5 nm; and d) a hexagonal mesoporous material with a cubic cage-like channel structure, the crystal structure of which has a body-centered cubic Im3m structure, the hexagonal mesoporous material carrier having an average pore size of from 4 to 15 nm, a specific surface area of from 450 to 550 m$^2$/g, a pore volume of from 0.5 to 1.5 mL/g, and an average particle size of from 0.5 to 10 μm.

The mesoporous materials prior to the thermal activation treatment that can be used in the present invention are known in the art and can be prepared by methods known per se.

In some embodiments, the mesoporous material may be prepared by a method comprising the steps of:
(a) providing a crystallizing mixture comprising a silicon source and a template agent;
(b) subjecting the crystallizing mixture to crystallization conditions, to form the mesoporous material; and
(c) recovering the mesoporous material.

Examples of useful silicon source include, but are not limited to, ethyl orthosilicate, methyl orthosilicate, propyl orthosilicate, sodium orthosilicate, and silica sol, more preferably methyl orthosilicate or ethyl orthosilicate.

In some specific embodiments, the mesoporous material may be prepared by method (1) comprising the steps of:
(1a) under solution conditions, mixing and contacting a template agent with trimethylpentane and tetramethoxysilane as a silicon source to obtain a solution A;
(1b) subjecting the solution A to crystallization conditions, to provide a mixture containing raw powder of eggshell-like mesoporous material;
(1c) filtering and drying the mixture obtained in step (1b) to obtain the raw powder of eggshell-like mesoporous material; and
(1d) subjecting the raw powder of eggshell-like mesoporous material to template agent-removing treatment.

According to the invention, in step (1a), the conditions for the mixing and contacting include: a temperature of 10 to 60° C., a time of 0.2 to 100 h, and a pH value of 1 to 6. The pH value can be, for example, formed by adding hydrochloric acid, or provided by using a suitable buffer system. In order to further facilitate the uniform mixing of the materials, according to a preferred embodiment of the invention, the mixing and contacting is performed under stirring.

According to the invention, in step (1a), the solution conditions may be aqueous solution conditions. Preferably, in order to facilitate the dissolution of the template agent, a buffer solution of acetic acid and sodium acetate with a pH of 1-6 can be used to form the solution conditions, and an alcohol reagent such as methanol, ethanol, n-propanol, isopropanol, or the like is added thereto, for example.

Preferably, a weight ratio of the template agent, the trimethylpentane and the tetramethoxysilane used is 1:(1.2 to 20):(0.1 to 15), and more preferably 1:(2 to 12):(0.5 to 10).

According to the invention, in step (1a), the template agent is preferably chosen so that the resultant raw powder of eggshell-like mesoporous material has a two-dimensional hexagonal channel-distributed structure. Preferably, the template agent is a triblock copolymer of polyoxyethylene-polyoxypropylene-polyoxyethylene, for example, EO$_{20}$PO$_{70}$EO$_{20}$ (commercially available from Aldrich Co. under the trade name P123). When the template agent is the polyoxyethylene-polyoxypropylene-polyoxyethylene, the number of moles of the template agent is calculated according to the average molecular weight of the polyoxyethylene-polyoxypropylene-polyoxyethylene.

Preferably, in step (1b), the crystallization conditions include: a temperature of 30 to 150° C., and a time of 4 to 72 h. According to a preferred embodiment, the crystallization is carried out by hydrothermal crystallization.

Preferably, in step (1c), the filtering process may include: after filtering, repeatedly washing with deionized water (the washing times may be 2-10), and then performing suction filtration.

Preferably, in step (1c), the drying may be performed in a drying oven. The drying conditions may include: a temperature of 110 to 150° C., and a time of 3 to 6 h.

According to a preferred embodiment of the invention, in step (1a), the process of the mixing and contacting comprises: under solution conditions, firstly conducting a first contacting of the template agent with trimethylpentane; and then conducting a second contacting of a mixture resulting from the first contacting with tetramethoxysilane. Preferably, the conditions of the first contacting include: a temperature of 10 to 60° C., a time of 0.1 to 20 h, and a pH value of 1 to 6. Preferably, the conditions of the second contacting include: a temperature of 10 to 60° C., a time of 0.1 to 80 h, and a pH value of 1 to 6.

According to the invention, in step (1d), the process of the template agent-removing treatment comprises: calcining the eggshell-like mesoporous material raw powder at 300 to 600° C. Preferably, the calcining is carried out for a period of time of 8 to 36 h, and preferably 8 to 20 h.

Alternatively, in step (1d), the process of the template agent-removing treatment is an alcohol washing process. For example, the process of the template agent-removing treatment comprises: washing the raw powder of the mesoporous material with an alcohol at a temperature of 50 to 120° C., for example, 70 to 120° C. or 90 to 120° C. for a period of time of 10 to 40 h. Examples of useful alcohols include, but are not limited to, ethanol, propanol, isopropanol, n-butanol, 2-butanol.

In some specific embodiments, the mesoporous material may be prepared by method (2) comprising the steps of:
(2a) in the presence of a template agent, mixing and contacting a silicon source with an acid agent, to provide a crystallizing mixture;
(2b) subjecting the crystallizing mixture to crystallization conditions, to provide a mixture containing the raw powder of a mesoporous material with a body-centered cubic structure;
(2c) filtering and drying the mixture from step (2b), to obtain the raw powder of the mesoporous material with body-centered cubic structure; and
(2d) subjecting the raw powder of the mesoporous material with body-centered cubic structure to template agent-removing treatment.

In method (2) of the present invention, the type of the template agent is not particularly limited, as long as the resultant mesoporous material raw powder can have a body-centered cubic structure. Preferably, the template agent is a triblock copolymer polyoxyethylene-polyoxypropylene-polyoxyethylene, for example, $EO_{106}PO_{70}EO_{106}$ (available from Aldrich Corporation under trade name F127, having a number average molecular weight, Mn, of 12600). When the template agent is polyoxyethylene-polyoxypropylene-polyoxyethylene, the number of moles of the template agent is calculated according to the average molecular weight of the polyoxyethylene-polyoxypropylene-polyoxyethylene.

According to the invention, the acid agent may be various acidic aqueous solutions conventionally used in the art, for example, at least one aqueous solution of hydrochloric acid, sulfuric acid, nitric acid, and hydrobromic acid, preferably an aqueous solution of hydrochloric acid.

The amount of the acid agent used is not particularly limited and can vary within a wide range. The amount is preferably such that the pH value for the mixing and contacting is 1 to 6.

Preferably, in step (2a), the conditions for contacting include: a temperature of 10 to 60° C., and preferably 25 to 60° C., a time of 25 min or more, and a pH of 1 to 6. In order to further facilitate the uniform mixing of the substances, according to a preferred embodiment of the present invention, the mixing and contacting is performed with stirring.

In the present invention, the amounts of the template agent and the silicon source used can vary within a wide range. For example, the molar ratio of the templating agent to the silicon source can be 1: 200-300; and preferably 1: 225-275.

In the method (2) of the present invention, the silicon source may be various silicon sources conventionally used in the art, and is preferably at least one of ethyl orthosilicate, methyl orthosilicate, propyl orthosilicate, sodium orthosilicate and silica sol, and more preferably methyl orthosilicate or ethyl orthosilicate.

According to a preferred embodiment of the invention, the process of mixing and contacting the silicon source with the acid agent in the presence of the template agent comprises: adding the triblock copolymer polyoxyethylene-polyoxypropylene-polyoxyethylene F127 as the template agent to an aqueous solution of hydrochloric acid, with a molar ratio of the triblock copolymer polyoxyethylene-polyoxypropylene-polyoxyethylene F127:water:hydrogen chloride being 1:9000 to 15000:100 to 500; stirring at a temperature of 25 to 60° C. to dissolve the copolymer; then, adding the ethyl orthosilicate as the silicon source to the solution obtained above, with the amount of the ethyl orthosilicate used being such that a molar ratio of the triblock copolymer polyoxyethylene-polyoxypropylene-polyoxyethylene F127 to the ethyl orthosilicate being 1:225 to 275; and stirring at a temperature of 25 to 60° C. for 25 minutes or more.

According to the invention, the crystallization conditions may include: a temperature of 30 to 150° C. and a time of 10 to 72 h. Preferably, the crystallization conditions include: a temperature of 90 to 120° C. and a time of 10 to 40 h. According to a preferred embodiment, the crystallization is carried out by hydrothermal crystallization.

The process for recovering the raw powder of the mesoporous material with a body-centered cubic structure (including filtering, drying and removing template agent) are as described above for the method (1).

In some specific embodiments, the mesoporous material may be prepared by method (3) comprising the steps of:
(3a) in the presence of a template agent, mixing and contacting a silicon source with an acid agent, to provide a crystallizing mixture;
(3b) subjecting the crystallizing mixture to crystallization conditions, to provide a mixture containing the raw powder of a mesoporous material with a two-dimensional hexagonal channel structure;
(3c) filtering and drying the mixture containing the raw powder of the mesoporous material with a two-dimensional hexagonal channel structure, to obtain the raw powder of the mesoporous material; and
(3d) subjecting the raw powder of the mesoporous material to template agent-removing treatment.

According to the invention, in step (3a), the type of the template agent is not particularly limited, as long as the resultant mesoporous material raw powder can have a two-dimensional hexagonal channel structure. Preferably, the template agent may be a triblock copolymer polyoxyethylene-polyoxypropylene-polyoxyethylene, for example, $EO_{20}PO_{70}EO_{20}$ (available from Aldrich Corporation under the trade name P123). When the template agent is polyoxyethylene-polyoxypropylene-polyoxyethylene, the number of moles of the template agent is calculated according to the average molecular weight of the polyoxyethylene-polyoxypropylene-polyoxyethylene.

The acid agent may be various acidic aqueous solutions conventionally used in the art, for example, at least one aqueous solution of hydrochloric acid, sulfuric acid, nitric acid, and hydrobromic acid, preferably an aqueous solution of hydrochloric acid.

The amount of the acid agent used is not particularly limited and can vary within a wide range. The amount is preferably such that the pH value for the mixing and contacting is 1 to 6.

Preferably, in step (3a), the conditions for the mixing and contacting include: a temperature of 25 to 60° C., a time of 25 min or more, and a pH of 1 to 6. In order to further facilitate the uniform mixing of the substances, according to a preferred embodiment of the present invention, the mixing and contacting is performed with stirring.

In the method (3) of the present invention, the amounts of the template agent and the silicon source used can vary within a wide range. For example, the molar ratio of the templating agent to the silicon source can be 1:10 to 90, and preferably 1:50 to 75.

In the method (3) of the present invention, the silicon source may be various silicon sources conventionally used in the art, and is preferably at least one of ethyl orthosilicate, methyl orthosilicate, propyl orthosilicate, sodium orthosilicate and silica sol, and more preferably methyl orthosilicate or ethyl orthosilicate.

According to a preferred embodiment of the invention, the process of mixing and contacting the silicon source with the acid agent in the presence of the template agent comprises: adding the triblock copolymer polyoxyethylene-polyoxypropylene-polyoxyethylene P123 as the template agent to an aqueous solution of hydrochloric acid, with a molar ratio of the triblock copolymer polyoxyethylene-polyoxypropylene-polyoxyethylene P123:water:hydrogen chloride being 1:9000 to 15000:100 to 500; stirring at a temperature of 25 to 60° C. to dissolve the copolymer; then, adding the ethyl orthosilicate as the silicon source to the solution obtained above, with the amount of the ethyl orthosilicate used being such that a molar ratio of the triblock copolymer polyoxyethylene-polyoxypropylene-polyoxyethylene P123 to the ethyl orthosilicate being 1:50 to 75; and stirring at a temperature of 25 to 60° C. for 25 minutes or more.

Preferably, the crystallization conditions include: a temperature of 90 to 180° C. and a time of 10 to 40 h. According to a preferred embodiment, the crystallization is carried out by hydrothermal crystallization. In order to ensure that a mesoporous molecular sieve material with a sufficiently large pore size can be obtained, the crystallization conditions include further preferably a temperature of 130 to 180° C.

The process for recovering the raw powder of the mesoporous material with a two-dimensional hexagonal channel structure (including filtering, drying and removing template agent) are as described above for the method (1).

In some specific embodiments, the mesoporous material may be prepared by method (4) comprising the steps of:
(4a) mixing and contacting a template agent, potassium sulfate, an acid agent and a silicon source, to provide a crystallizing mixture;
(4b) subjecting the crystallizing mixture to crystallization conditions, to provide a mixture containing the raw powder of a hexagonal mesoporous material having a body-centered cubic Im3m structure;
(4c) filtering and drying, to obtain the raw powder of the hexagonal mesoporous material having a body-centered cubic Im3m structure; and
(4d) subjecting the raw powder of the hexagonal mesoporous material to a template agent-removing treatment.

In the method (4) of the present invention, the silicon source may be various silicon sources conventionally used in the art, and is preferably at least one of ethyl orthosilicate, methyl orthosilicate, propyl orthosilicate, sodium orthosilicate and silica sol, and more preferably methyl orthosilicate or ethyl orthosilicate.

According to some preferred embodiments of the invention, the process for preparing the raw powder of the hexagonal mesoporous material having a body-centered cubic Im3m structure may comprise: mixing and contacting the template agent, potassium sulfate, the acid agent and the silicon source, for example, ethyl orthosilicate, and subjecting the resulting mixture to crystallization, filtering and drying. The order of the mixing and contacting is not particularly limited, and the template agent, potassium sulfate, the acid agent and the silicon source may be simultaneously mixed, or any two or three of said materials may be mixed first, and then other materials are added and mixed uniformly. According to a preferred embodiment, the template agent, potassium sulfate and the acid agent are mixed uniformly first, and then the silicon source such as ethyl orthosilicate is added and mixed uniformly.

In the method (4) of the invention, the amounts of the template agent, potassium sulfate and the silicon source such as ethyl orthosilicate used may vary within a wide range. For example, a molar ratio of the template agent to potassium sulfate to the silicon source such as ethyl orthosilicate may be 1:100 to 800:20 to 200, preferably 1:150 to 700:80 to 180, and more preferably 1:200 to 400:100 to 150.

In the method (4) of the invention, the template agent may be various template agents conventionally used in the art. For example, the template agent may a triblock copolymer polyoxyethylene-polyoxypropylene-polyoxyethylene, for example, Synperonic F108 (available from Fuka Co., having a molecular formula of $EO_{132}PO_{60}EO_{132}$ and an average molecular weight, $M_n$, of 14600). The number of moles of the polyoxyethylene-polyoxypropylene-polyoxyethylenethe is calculated based on the average molecular weight of the polyoxyethylene-polyoxypropylene-polyoxyethylene.

In the method (4) of the invention, the acid agent may be various acidic aqueous solutions conventionally used in the art, for example, at least one aqueous solution of hydrochloric acid, sulfuric acid, nitric acid, and hydrobromic acid, preferably an aqueous solution of hydrochloric acid.

The amount of the acid agent used is not particularly limited and can vary within a wide range. The amount is preferably such that the pH value of the mixture is 1 to 7.

According to the present invention, there is no particular limitation to the conditions for the mixing and contacting. For example, the conditions for the mixing and contacting may include: a temperature of 25 to 60° C., a time of 10 to 240 min, and a pH value of 1 to 7. In order to further facilitate the uniform mixing of the substances, according to a preferred embodiment of the present invention, the mixing and contacting is performed with stirring.

According to a preferred embodiment of the invention, the process of mixing and contacting the template agent, potassium sulfate, the acid agent and the silicon source such as ethyl orthosilicate comprises: adding triblock copolymer polyoxyethylene-polyoxypropylene-polyoxyethylene F108 as the template agent to an aqueous solution of hydrochloric acid, with a molar ratio of the triblock copolymer polyoxyethylene-polyoxypropylene-polyoxyethylene F108:potassium sulfate:water:hydrogen chloride being 1:200 to 400:10000 to 30000:100 to 900; stirring at a temperature of 25 to 60° C. to dissolve the copolymer; then, adding the silicon source such as ethyl orthosilicate to the solution obtained above, with the amount of the silicon source used being such that a molar ratio of the triblock copolymer polyoxyethylene-polyoxypropylene-polyoxyethylene F108 to the silicon source being 1:100 to 150; and stirring at a temperature of 25 to 60° C. for 10 to 240 minutes.

In the method (4) of the invention, the crystallization conditions are not particularly limited. For example, the crystallization conditions may include: a temperature of 25 to 100° C., preferably 25 to 60° C., and more preferably 30 to 55° C.; and a time of 10 to 72 h, and preferably 10 to 40 h. According to a preferred embodiment, the crystallization is carried out by hydrothermal crystallization.

The process for recovering the raw powder of the hexagonal mesoporous material with a body-centered cubic Im3m structure (including filtering, drying and removing template agent) are as described above for the method (1).

According to the invention, before the mesoporous material is used in the preparation of a catalyst component, it is necessary to thermally activate the mesoporous material in order to remove the hydroxyl groups and residual moisture present on the surface of the mesoporous material. Conditions of the thermal activation treatment may include calcining the mesoporous material at a temperature of 300 to 900° C. for 3 to 48 h, preferably 3 to 24 h, and more preferably 7 to 10 h under an inert atmosphere such as nitrogen or argon atmosphere.

In some embodiments, the thermally activated mesoporous material according to the present invention may be further treated with a chlorine-containing silane. Examples of useful chlorine-containing silane include, but are not limited to, dichlorodimethoxysilane, monochlorotrimethoxysilane, dichlorodiethoxysilane, and monochlorotriethoxysilane.

The chlorine-containing silane treatment may be accomplished by stirring or milling the thermally-activated mesoporous material together with the chlorine-containing silane in the presence or absence of other media such as an inert solvent, and the treatment temperature can be in a range of from 20 to 150° C., preferably from 30 to 120° C., and more preferably from 40 to 100° C.

Conveniently, the chlorine-containing silane treatment may be performed simultaneously with a ball milling treatment described hereinafter. That is, before or during the ball milling treatment, the chlorine-containing silane is added to the thermally activated mesoporous material in a ball mill jar.

The mesoporous material treated with the chlorine-containing silane according to the present invention has a contact angle of at least 40°, preferably 50 to 150°, more preferably 60 to 140°, and still more preferably 70 to 130°.

In a second aspect, the present invention provides a method of preparing the polyolefin catalyst component, comprising the steps of:

(i) providing a thermally activated mesoporous material, wherein the thermal activation treatment on the mesoporous material is performed under an inert atmosphere at a temperature of 300 to 900° C. for a period of time of 3 to 48 hours, preferably 3 to 24 h, and more preferably 7 to 10 h;

(ii) under an inert atmosphere, (iia) conducting impregnation treatment of the thermally activated mesoporous material with a solution containing a magnesium component and then with a solution containing a titanium component, (iib) conducting impregnation treatment of the thermally activated mesoporous material with a solution containing a titanium component and then with a solution containing a magnesium component, or (iic) conducting co-impregnation treatment of the thermally activated mesoporous material with a solution containing both a titanium component and a magnesium component, to obtain a slurry to be sprayed; and (iii) spray drying the slurry to be sprayed from step (ii), to obtain the solid polyolefin catalyst component.

In some embodiments, the method further comprises: prior to step (ii), treating the thermally activated mesoporous material with a chlorine-containing silane and/or subjecting the thermally activated mesoporous material to a ball milling treatment.

In some embodiments, the chlorine-containing silane is selected from the group consisting of dichlorodimethoxysilane, monochlorotrimethoxysilane, dichlorodiethoxysilane, and monochlorotriethoxysilane.

The operation of the treating with the chlorine-containing silane is as described above. In some embodiments, the treating the thermally activated mesoporous material with the chlorine-containing silane is carried out as follows: under an inert atmosphere, the thermally activated mesoporous material and the chlorine-containing silane are ball milled together in a ball mill jar.

In the present invention, the specific operation methods and conditions of the ball milling treatment are selected so that the channel structure of the mesoporous material is not or substantially not broken down. Those skilled in the art can select various suitable conditions to implement the present invention according to the above principles. Specifically, the ball milling treatment may be performed in a ball mill. The diameter of the milling balls in the ball mill can be 2 to 80 mm, or 2 to 50 mm, or 2 to 30 mm, or 2 to 20 mm, or 3 to 15 mm, for example, 2 to 3 mm or 3 to 5 mm. The milling balls in the ball mill can have the same or different diameters. Generally, the milling balls in the ball mill have different diameters, wherein the number ratio of large balls (having a diameter greater than two-thirds of (the maximum diameter–the minimum diameter)) to medium balls (having a diameter between two-thirds of (the maximum diameter–the minimum diameter) and one-third of (the maximum diameter–the minimum diameter)) to small balls (having a diameter smaller than one-third of (the maximum diameter–the minimum diameter)) can be roughly 1:2:3. The number of the milling balls can be reasonably selected according to the size of the ball mill jar. For example, a ball mill jar with a size of 50 to 150 mL may usually use 20 to 80 milling balls. The material of the milling balls can be agate, PTFE, etc., and agate is preferred. The conditions of the ball milling may include: a rotation speed of the ball mill jar of 100 to 800 r/min, preferably 200 to 700 r/min, and more preferably 300 to 500 r/min, a temperature inside the ball mill jar of 15 to 100° C., and a time of ball milling of 0.1 to 100 hours. Preferably, the conditions of the ball milling treatment are such that the average particle size of the mesoporous material obtained by the ball milling is less than 10 μm, for example, in a range of from 0.05 to 5 μm, preferably from 0.1 to 3 μm, and more preferably from 0.1 to 2 μm.

According to the invention, the solution containing a magnesium component and/or a titanium component may be a solution containing the magnesium component and/or the titanium component in an organic solvent, and the organic solvent may be an electron donor solvent, for example, at least one selected from the group consisting of alkyl esters of aliphatic or aromatic carboxylic acids, aliphatic ethers and cyclic ethers, preferably at least one of $C_1$-$C_4$ alkyl esters of $C_1$-$C_4$ saturated aliphatic carboxylic acids, alkyl esters of $C_7$-$C_5$ aromatic carboxylic acids, $C_2$-$C_6$ aliphatic ethers and $C_3$-$C_4$ cyclic ethers; more preferably at least one of methyl formate, ethyl formate, methyl acetate, ethyl acetate, butyl acetate, diethyl ether, dihexyl ether and tetrahydrofuran (THF); and even more preferably tetrahydrofuran.

According to the invention, the supporting of the magnesium component and/or the titanium component on the mesoporous material may be accomplished through impregnation, wherein the magnesium component and/or the titanium component enter the channels of the mesoporous material by virtue of the capillary pressure of the channel structure of the carrier and, at the same time, the magnesium component and/or the titanium component will also be adsorbed on the surface of the mesoporous material until the magnesium component and/or the titanium component reaches adsorption equilibrium on the surface of the mesoporous material. The impregnation treatment may be a co-impregnation treatment or a stepwise impregnation treatment. In order to save preparation costs and simplify the experimental process, the impregnation treatment is preferably a co-impregnation treatment. Preferably, the conditions of the impregnation treatment may include: an impregnation temperature of 25 to 100° C., preferably 40 to 80° C., and an impregnation time of 0.1 to 5 h, preferably 1 to 4 h.

According to the invention, the amounts of the mesoporous material, the magnesium component and the titanium component used are preferably such that in the prepared polyolefin catalyst component, based on the total weight of the polyolefin catalyst component, the content of the mesoporous material ranges from 20 to 90 wt. %, preferably from 30 to 70 wt. %, the content of the magnesium component in terms of magnesium element ranges from 1 to 50 wt. %, preferably from 1 to 30 wt. %, more preferably from 2 to 25 wt. %, still more preferably from 3 to 20 wt. %, the content of the titanium component in terms of titanium element ranges from 1 to 50 wt. %, preferably from 1 to 30 wt. %, more preferably from 1 to 10 wt. %, still more preferably from 1 to 5 wt. %. The combined content of the magnesium component and the titanium component (in terms of element) preferably ranges from 10 to 30 wt. %, based on the total weight of the polyolefin catalyst component.

Preferably, in step (ii), a weight ratio of the mesoporous material to the solution containing the magnesium component and/or the titanium component may be 1:50 to 150, and preferably 1:75 to 120.

Preferably, in step (ii), the amounts of the magnesium component and the titanium component used are such that in the prepared polyolefin catalyst component, a molar ratio of the magnesium component in terms of magnesium element to the titanium component in terms of titanium element ranges from 0.5 to 50:1, preferably from 2 to 30:1, and more preferably from 5 to 18:1.

According to the invention, the magnesium component may a magnesium compound of formula $Mg(OR^1)_m X_{2-m}$, wherein $R^1$ is a hydrocarbon group having 2 to 20 carbon atoms, for example, a $C_2$-$C_{10}$ alkyl, X is a halogen atom, and $0 \leq m \leq 2$. For example, the magnesium component may be at least one of diethoxy magnesium, dipropoxy magnesium, dibutoxy magnesium, dioctoxy magnesium, magnesium dichloride, and magnesium dibromide.

According to the invention, the titanium component may be a titanium compound of formula $Ti(OR^2)_n X_{4-n}$, wherein $R^2$ is a hydrocarbon group having 1 to 20 carbon atoms, for example, a $C_1$-$C_{10}$ alkyl, X is a halogen atom, and $0 \leq n \leq 4$, and/or titanium trichloride. For example, the titanium component may be at least one of tetraethyl titanate, tetramethyl titanate, tetrabutyl titanate, tetraisopropyl titanate, titanium trichloride, and titanium tetrachloride.

In some embodiments of the method of the present invention, a magnesium component precursor that can be converted into the above-described magnesium component during the preparation of the catalyst component can be used in place of the magnesium component, and/or a titanium component precursor that can be converted into the above-described titanium component during the preparation of the catalyst component can be used in place of the titanium component.

According to the invention, there is not particular limitations to the concentrations of the magnesium component and the titanium component in the solution containing the magnesium component and/or the titanium component. For example, the concentrations of the magnesium component and the titanium component may be those conventionally selected in the art. For instance, the concentration of the magnesium component may range from 0.1 to 1 mol/L, and the concentration of the titanium component may range from 0.01 to 0.2 mol/L.

According to the invention, the inert gas used in the impregnation treatment is a gas that does not react with the raw materials and products. For example, it may be at least one of nitrogen and gases of Group zero of the element periodic table, preferably nitrogen.

According to the invention, the spray drying may be carried out according to conventional processes. For example, the spray drying method may be at least one selected from pressure spray drying methods, centrifugal spray drying methods, and air-flow spray drying methods. According to a preferred embodiment of the present invention, the spray drying is accomplished through an air-flow spray drying method. The spray drying can be performed in an atomizer. The spray drying conditions may include: a protective atmosphere of nitrogen or argon, a gas inlet temperature of 100 to 150° C., a gas outlet temperature of 100 to 120° C., and a carrying gas flow rate of 10 to 50 L/s. Preferably, the spray drying conditions are such that the prepared polyolefin catalyst component has an average particle size of from 0.5 to 50 μm, preferably 3 to 25 μm or 1 to 20 μm or 0.5 to 20 μm or 5 to 30 μm, a particle diameter distribution value ((D90−D10)/D50) of 0.7 to 2.0, preferably 0.8 to 1.8, for example, 0.85 to 0.95 or 1.7 to 1.8 or 1.6 to 1.7.

According to a preferred embodiment of the invention, step (ii)-(iii) are performed as follows: under an inert atmosphere, in a reactor equipped with agitation, electron donor solvent tetrahydrofuran (THF) is added and the reactor temperature is controlled to 25 to 40° C. Magnesium dichloride and titanium tetrachloride are added quickly after the stirring is turned on. The system temperature is adjusted to 60 to 75° C. and the mixture is allowed to react at the constant temperature for 1-5 hours until the magnesium dichloride and titanium tetrachloride are completely dissolved, resulting in an organic solution containing magnesium chloride and titanium tetrachloride. The organic solution containing magnesium dichloride and titanium tetrachloride is mixed with the mesoporous material, and the ratios of the individual components are controlled to be: relative to 1 mole of titanium element, 0.5 to 50 moles, preferably 1 to 10 moles for magnesium element, and 0.5 to 200 moles, preferably 20 to 200 moles for the electron donor solvent tetrahydrofuran (THF). The resultant mixture is stirred at a reactor temperature controlled at 60 to 75° C. for 0.1 to 5 hours to obtain a uniform slurry to be sprayed. The mesoporous material should be added in an amount sufficient to form a slurry suitable for spray molding. Then, the obtained slurry to be sprayed is introduced into a spray dryer operated under $N_2$ atmosphere, where the gas inlet temperature is controlled to 100 to 150° C., the gas outlet temperature is controlled to 100 to 120° C., and the carrying gas flow rate is controlled to 10 to 50 Us, to obtain spherical particles with an average particle size of 0.5 to 50 μm, preferably 3 to 25 μm or 1 to 20 μm or 0.5 to 20 μm.

The following technical solution has also been contemplated:

A method for preparing a polyolefin catalyst component, comprising:
(i) providing a thermally activated mesoporous material, wherein the thermal activation treatment on the mesoporous material is performed under an inert atmosphere at a temperature of 300 to 900° C. for a period of time of 3 to 48 hours;
(ii) under an inert atmosphere, impregnating the thermally activated mesoporous material with a solution containing a magnesium component, to obtain a slurry to be sprayed;
(iii) spray drying the slurry to be sprayed from step (ii), to obtain a composite carrier containing the magnesium component and the mesoporous material; and
(iv) supporting a titanium component on the composite carrier by an impregnation process, to provide a solid polyolefin catalyst component.

The operations and conditions of each step of this technical solution are similar to those described above.

The polyolefin catalyst component prepared by the above-described methods has spherical or spheroid-like morphological characteristics, so it is sometimes conveniently referred to as a spherical catalyst component. The term "spherical catalyst component" as used herein means that the catalyst component has a spherical or spheroid-like particle morphology, but the catalyst component is not required to have a perfect spherical morphology. The catalyst component of the present invention has a high loading of the magnesium component and the titanium component and a reasonable channel structure. When the catalyst component of the present invention is used in the polymerization of olefin monomers, the polymerization activity is higher, the resulting polymer particles have a good morphology, a narrow molecular weight distribution, and excellent flowability.

In a third aspect, the present invention provides a mesoporous material-containing polyolefin catalyst component prepared by the above-described methods.

In some embodiments, the polyolefin catalyst component of the present invention comprises a thermally activated mesoporous material carrier as well as a magnesium component and a titanium component supported thereon. The mesoporous material, its thermal activation treatment, ball milling treatment, and optional chlorine-containing silane treatment are as described above, and the magnesium component and the titanium component are as described above.

The polyolefin catalyst component of the present invention may further comprise an electron donor component. In some embodiments, the electron donor component is derived from the electron donor solvent present in the slurry to be sprayed.

In some embodiments, the polyolefin catalyst component of the present invention comprises a thermally activated mesoporous material, magnesium, titanium, a halogen, and an electron donor.

According to the invention, based on the total weight of the polyolefin catalyst component, the content of the mesoporous material carrier ranges from 20 to 90 wt. %, preferably 30 to 70 wt. %, the content of the magnesium component in terms of magnesium element ranges from 1 to 50 wt. %, preferably from 1 to 30 wt. %, more preferably from 2 to 25 wt. %, still more preferably from 3 to 20 wt. %, the content of the titanium component in terms of titanium element ranges from 1 to 50 wt. %, preferably from 1 to 30 wt. %, more preferably from 1 to 10 wt. %, still more preferably from 1 to 5 wt. %.

Preferably, in the polyolefin catalyst component, a molar ratio of the magnesium component (in terms of magnesium element) to the titanium component (in terms of titanium element) is 0.5 to 50:1, and preferably 5 to 18:1.

In some embodiments, the polyolefin catalyst component of the present invention comprises the eggshell-like mesoporous material carrier described above. The eggshell-like mesoporous material carrier has a specific body-centered cubic crystal structure, and has characteristics of uniformly distributed mesoporous channel structure, suitable pore size, large pore volume, good mechanical strength, and good structure stability so that it is particularly beneficial to good dispersion of magnesium and titanium active components on the surface of the carrier, making the prepared polyolefin catalyst component have both the advantages of supported catalysts such as good dispersion of metal active components, high loading, less side reactions, simple post-treatment, etc. and high catalytic activity. Thus, when used in the polymerization reaction of olefin monomers, the supported catalyst component prepared by using the eggshell-like mesoporous material carrier as a carrier will exhibit better catalytic activity and significantly improved conversion of the raw materials.

According to the invention, by controlling the structural parameters of the eggshell-like mesoporous material carrier within the above ranges, it can be ensured that the eggshell-like mesoporous material carrier is less likely to agglomerate, and the supported catalyst component prepared by using it as a carrier can enhance the conversion of reaction raw materials during olefin polymerization. When the eggshell-like mesoporous material carrier has a specific surface area less than 100 $m^2/g$ and/or a pore volume less than 0.5 mL/g, the supported catalyst component prepared by using it as a carrier will has a significantly reduced catalytic activity; when the eggshell-like mesoporous material carrier has a specific surface area greater than 500 $m^2/g$ and/or a pore volume greater than 1.5 mL/g, the supported catalyst component prepared by using it as a carrier is prone to agglomeration during the olefin polymerization, thereby affecting the conversion of olefin monomers in the olefin polymerization.

Preferably, the eggshell-like mesoporous material carrier has a pore volume of from 0.5 to 1.2 mL/g, a specific surface area of from 150 to 350 $m^2/g$, an average pore diameter of from 7 to 12 nm, an average particle size before ball milling of from 3 to 20 μm, and an average particle size after ball milling of from 0.05 to 5 μm, preferably 0.1 to 3 μm, and more preferably 0.1 to 2 μm, in order to ensure that the eggshell-like mesoporous material carrier has the advantages of larger pore size, larger pore volume, and larger specific surface area, which are more conducive to good dispersion of magnesium and/or titanium active components on the surface of the eggshell mesoporous material carrier, and in turn that the polyolefin catalyst component prepared therefrom has excellent catalytic performance, thereby obtaining beneficial effects that the conversion of olefin monomers is high and the resulting polymers have good particle morphology, narrow molecular weight distribution, and excellent flowability.

Preferably, the polyolefin catalyst has a pore volume of from 0.5 to 1 mL/g, a specific surface area of from 120 to 300 $m^2/g$, an average pore diameter of from 7 to 12 nm, an average particle diameter of from 3 to 25 μm, and a particle diameter distribution value ((D90−D10)/D50) of from 0.85 to 0.95.

In some embodiments, the polyolefin catalyst component of the invention comprises a mesoporous material carrier with a body-centered cubic crystal structure as well as a magnesium component and a titanium component supported thereon, wherein the mesoporous material carrier has an average particle size of from 0.05 to 5 μm, preferably 0.1 to 3 μm, more preferably 0.1 to 2 μm, a specific surface area of from 700 to 900 $m^2/g$, a pore volume of from 0.5 to 1 mL/g, and an average pore diameter of from 1 to 5 nm.

Since the mesoporous material carrier has a specific body-centered cubic crystal structure and has characteristics of uniformly distributed mesoporous channel structure, suitable pore size, large pore volume, good mechanical strength, and good structure stability, it is particularly beneficial to good dispersion of magnesium and titanium active components on the surface of the carrier, making the prepared polyolefin catalyst component have both the advantages of supported catalyst components such as good dispersion of metal active components, high loading, less side reactions, simple post-treatment, etc. and high catalytic activity. Thus, when used in the polymerization reaction of olefin monomers, the prepared supported catalyst component will exhibit better catalytic activity and significantly improved conversion of the raw materials.

According to the invention, by controlling the structural parameters of the mesoporous material carrier with the body-centered cubic crystal structure within the above ranges, it can be ensured that the mesoporous material carrier is less likely to agglomerate, and the supported catalyst component prepared by using it as a carrier can enhance the conversion of reaction raw materials during olefin polymerization. When the mesoporous material carrier has a specific surface area less than 700 $m^2/g$ and/or a pore volume less than 0.5 mL/g, the supported catalyst component prepared by using it as a carrier will has a significantly reduced catalytic activity; when the mesoporous material carrier has a specific surface area greater than 900 m$^2$/g and/or a pore volume greater than 1 mL/g, the supported catalyst component prepared by using it as a carrier is prone to agglomeration during the olefin polymerization, thereby affecting the conversion of olefin monomers in the olefin polymerization.

Preferably, the mesoporous material carrier has an average particle size before ball milling of from 3 to 9 μm, an average particle size after ball milling of from 0.05 to 5 μm, preferably from 0.1 to 3 μm, more preferably from 0.1 to 2 μm, a specific surface area of from 750 to 850 m$^2$/g, a pore volume of from 0.6 to 0.8 mL/g, and an average pore diameter of from 1.5 to 4.5 nm, in order to ensure that the mesoporous material carrier has the advantages of larger pore size, larger pore volume, and larger specific surface area, which are more conducive to good dispersion of magnesium and titanium active components on the surface of the mesoporous material carrier, and in turn that the polyolefin catalyst component prepared therefrom has excellent catalytic performance, thereby obtaining beneficial effects that the conversion of olefin monomers is high and the resulting polymers have good particle morphology, narrow molecular weight distribution, and excellent flowability.

Preferably, the polyolefin catalyst component has an average particle size of from 3 to 25 μm, a specific surface area of from 700 to 800 m$^2$/g, a pore volume of from 0.5 to 0.8 mL/g, an average pore diameter of from 1.5 to 4.5 nm, and an particle diameter distribution value of from 0.85 to 0.95.

In some embodiments, the polyolefin catalyst component of the invention comprises a mesoporous material carrier with a two-dimensional hexagonal channel structure as well as a magnesium component and a titanium component supported thereon, wherein the mesoporous material carrier has an average pore size of from 4 to 15 nm, a specific surface area of from 550 to 650 m$^2$/g, a pore volume of from 0.5 to 1.5 mL/g, an average particle diameter of from 0.05 to 5 μm, preferably 0.1 to 3 μm, and more preferably 0.1 to 2 μm.

Since the mesoporous material carrier has a specific two-dimensional hexagonal channel structure, which is a good long-range ordered structure, the mesoporous material exhibits high strength in a wide temperature range and under a large strain state. In addition, the unique two-dimensional hexagonal channel structure of the mesoporous material, combined with its narrow pore size distribution and uniform channel distribution, is conducive to good dispersion of metal components on the surface of the carrier, making the prepared polyolefin catalyst component have both the advantages of supported catalysts such as good dispersion of magnesium and titanium active components, high loading, less side reactions, simple post-treatment, etc. and high catalytic activity and high stability. Thus, when used in the polymerization reaction of olefin monomers, the supported catalyst component will exhibit better catalytic activity and significantly improved conversion of the raw materials.

According to the invention, by controlling the structural parameters of the mesoporous material with the two-dimensional hexagonal channel structure within the above ranges, it can be ensured that the mesoporous material is less likely to agglomerate, and the supported catalyst component prepared by using it as a carrier can enhance the conversion of reaction raw materials during olefin polymerization. When the mesoporous material has a specific surface area less than 550 m$^2$/g and/or a pore volume less than 0.5 mL/g, the supported catalyst component prepared by using it as a carrier will has a significantly reduced catalytic activity; when the mesoporous material has a specific surface area greater than 650 m$^2$/g and/or a pore volume greater than 1.5 mL/g, the supported catalyst component prepared by using it as a carrier is prone to agglomeration during the olefin polymerization, thereby affecting the conversion of olefin monomers in the olefin polymerization.

Preferably, the mesoporous material has an average pore size of from 4 to 12 nm, for example, 4 nm, 5 nm, 6 nm, 7 nm, 8 nm, 9 nm, 10 nm, 11 nm and 12 nm, and any average pore size in a range between any two listed average pore sizes, a specific surface area of from 580 to 620 m$^2$/g, a pore volume of from 0.5 to 1 mL/g, an average particle size before ball milling treatment of from 0.8 to 10 μm, an average particle size after ball milling treatment of from 0.05 to 5 μm, preferably 0.1 to 3 μm, and more preferably 0.1 to 2 μm, in order to ensure that the mesoporous material has the advantages of larger pore size, larger pore volume, and larger specific surface area, which are more conducive to good dispersion of magnesium and titanium active components on the surface of the mesoporous material, and in turn that the polyolefin catalyst component prepared therefrom has excellent catalytic performance, thereby obtaining beneficial effects that the conversion of olefin monomers is high and the resulting polymers have good particle morphology, narrow molecular weight distribution, and excellent flowability.

Preferably, the polyolefin catalyst component has an average pore size of from 4 to 15 nm, a specific surface area of from 520 to 600 m$^2$/g, a pore volume of from 0.6 to 1.4 mL/g, an average particle diameter of from 1 to 20 μm, and a particle diameter distribution value of from 1.7 to 1.8.

In some embodiments, the polyolefin catalyst component of the invention comprises a hexagonal mesoporous material carrier with a cubic cage-like channel structure as well as a magnesium component and a titanium component supported thereon, wherein the crystal structure of the hexagonal mesoporous material has a body-centered cubic Im3m structure, and the hexagonal mesoporous material has an average pore size of from 4 to 15 nm, a specific surface area of from 450 to 550 m$^2$/g, a pore volume of from 0.5 to 1.5 mL/g, an average particle diameter of from 0.05 to 5 μm, preferably 0.1 to 3 μm, and more preferably 0.1 to 2 μm.

The hexagonal mesoporous material carrier has a specific Im3m body-centered cubic crystal structure, which is a non-close-packing manner. This good long-range ordered structure makes the hexagonal mesoporous material exhibit high strength in a wide temperature range and under a large strain state. In addition, the unique pore structure of the hexagonal mesoporous material, combined with its narrow pore size distribution and uniform channel distribution, is conducive to good dispersion of magnesium and titanium active components on the surface of the carrier, making the prepared polyolefin catalyst component have both the advantages of supported catalysts such as good dispersion of metal active components, high loading, less side reactions, simple post-treatment, etc., and high catalytic activity and high stability. Thus, when used in the polymerization reaction of olefin monomers, the supported catalyst component will exhibit better catalytic activity and significantly improved conversion of the raw materials.

According to the invention, by controlling the structural parameters of the hexagonal mesoporous material within the above ranges, it can be ensured that the hexagonal mesoporous material is less likely to agglomerate, and the supported catalyst component prepared by using it as a carrier can enhance the conversion of reaction raw materials during olefin polymerization. When the hexagonal mesoporous material has a specific surface area less than 450 m²/g and/or a pore volume less than 0.5 mL/g, the supported catalyst component prepared by using it as a carrier will has a significantly reduced catalytic activity; when the hexagonal mesoporous material has a specific surface area greater than 550 m²/g and/or a pore volume greater than 1.5 mL/g, the supported catalyst component prepared by using it as a carrier is prone to agglomeration during the olefin polymerization, thereby affecting the conversion of olefin monomers in the olefin polymerization.

Preferably, the hexagonal mesoporous material has an average pore size of from 4 to 12 nm, for example, 4 nm, 5 nm, 6 nm, 7 nm, 8 nm, 9 nm, 10 nm, 11 nm, and 12 nm, and any average pore size in a range between any two listed average pore sizes, a specific surface area of from 480 to 520 m²/g, a pore volume of from 0.5 to 1 mL/g, an average particle size before ball milling treatment of from 0.8 to 8 μm, an average particle size after ball milling treatment of from 0.05 to 5 μm, preferably 0.1 to 3 μm, and more preferably 0.1 to 2 μm, in order to ensure that the hexagonal mesoporous material has the advantages of larger pore size, larger pore volume, and larger specific surface area, which are more conducive to good dispersion of magnesium and titanium active components on the surface of the hexagonal mesoporous material, and in turn that the polyolefin catalyst component prepared therefrom has excellent catalytic performance, thereby obtaining beneficial effects that the conversion of olefin monomers is high and the resulting polymers have good particle morphology, low bulk density, and excellent flowability.

Preferably, the polyolefin catalyst component has an average pore size of from 4 to 15 nm, a specific surface area of from 450 to 500 m²/g, a pore volume of from 0.5 to 1 mL/g, an average particle diameter of from 0.5 to 20 μm, preferably from 0.8 to 15 μm, and a particle diameter distribution value of from 1.6 to 1.7.

Without being bound by any theory, it is believed that due to its appropriately sized and narrowly distributed pore size, the mesoporous material provides a considerable effective specific surface area so that the catalyst component prepared therefrom can have a greater proportion of effective catalytically active center, thereby showing high catalytic activity. Moreover, the mesoporous material has a suitable hardness, and it therefore can be easily ball milled to a desired particle size to be used as a filler in the slurry to be spray dried. In addition, the chlorine-containing silane treatment described in the present invention can modify the surface properties of the mesoporous material, making the treated mesoporous material less likely to agglomerate and settle in the slurry to be spray-dried, thereby improving the stability and handling property of the slurry to be spray-dried made from the treated mesoporous material.

In a fourth aspect, the present invention provides a method for polymerizing olefins comprising: a) polymerizing an olefin monomer under polymerization conditions in the presence of the polyolefin catalyst component according to the present invention and a cocatalyst, to provide a polyolefin; and b) recovering the polyolefin.

The reactions for the polymerization of olefin monomers to prepare polyolefins, in which the polyolefin catalyst component of the present invention is used, include homopolymerization of ethylene and copolymerization of ethylene with other α-olefins, wherein the α-olefins can be at least one selected from propylene, 1-butene, 1-hexene, 1-octene, 1-pentene, and 4-methyl-1-pentene.

According to the invention, the reaction conditions of the polymerization are not particularly limited, and may be conventional olefin polymerization reaction conditions in the art. For example, the reaction may be carried out under an inert atmosphere, and the conditions of the polymerization may include: a temperature of 10 to 100° C., a time of 0.5 to 5 h, and a pressure of 0.1 to 2 MPa; preferably, the conditions of the polymerization may include: a temperature of 20 to 95° C., a time of 1 to 4 h, and a pressure of 0.5 to 1.5 MPa; further preferably a temperature of 70 to 85° C., a time of 1 to 2 h, and a pressure of 1 to 1.5 MPa.

The pressure mentioned in the present invention refers to gauge pressure.

In the present invention, the polymerization may be carried out in the presence of a solvent. The solvent that can be used in the polymerization is not particularly limited, and it may be hexane, for example.

In a specific embodiment, the supported polyolefin catalyst component may be a supported polyethylene catalyst component, and the polymerization is an ethylene polymerization. The method for polymerizing ethylene comprises polymerizing ethylene under ethylene polymerization conditions in the presence of a catalyst and a cocatalyst, and the cocatalyst is preferably an aluminum alkyl compound.

The cocatalyst that can be used in the method of the present invention may be any cocatalyst commonly used in the art. For example, the cocatalyst may be an aluminum alkyl compound represented by formula I:

$$AlR_nX_{(3-n)} \qquad \text{Formula I}$$

wherein R may each be a $C_1$-$C_8$ alkyl, preferably a $C_1$-$C_5$ alkyl; X may each be one of halogen atoms, preferably chlorine atom; and n is 1, 2 or 3.

Preferably, the $C_1$-$C_8$ alkyl may be one or more of methyl, ethyl, n-propyl, isopropyl, n-butyl, sec-butyl, isobutyl, tert-butyl, n-pentyl, isopentyl, tert-amyl, n-hexyl, n-octyl, 2-ethylhexyl and neopentyl.

Specific examples of the aluminum alkyl compound include, but are not limited to, trimethyl aluminum, dimethyl aluminum chloride, triethyl aluminum, diethyl aluminum chloride, tri-n-propyl aluminum, di-n-propyl aluminum chloride, tri-n-butyl aluminum, tri-sec-butyl aluminum, tri-tert-butyl aluminum, di-n-butyl aluminum chloride and diisobutyl aluminum chloride. Most preferably, the aluminum alkyl compound is triethyl aluminum.

The amount of the aluminum alkyl compound may also be a conventional choice in the art. Generally, a molar ratio of the catalyst component to the aluminum alkyl compound may be 1:20 to 300.

In the present invention, the method for olefin polymerization may further comprise, after the polymerization reaction is completed, separating the final reaction mixture, thereby obtaining a powder of polyolefin particles.

The present invention will be illustrated by the following examples, but the present invention is not limited thereto.

In the following examples and comparative examples:
triblock copolymer polyoxyethylene-polyoxypropylene-polyoxyethylene F127 was purchased from Aldrich, abbreviated as F127, and has a molecular formula of $EO_{106}PO_{70}EO_{106}$ and an average molecular weight, Mn, of 12600;
triblock copolymer polyoxyethylene-polyoxypropylene-polyoxyethylene P123 was purchased from Aldrich, abbreviated as P123, and has a molecular formula of $EO_{20}PO_{70}EO_{20}$ and an average molecular weight, Mn, of 5800, which is the substance with the registration number of 9003-11-6 in the American Chemical Abstracts;

polyoxyethylene-polyoxypropylene-polyoxyethylene Synperonic F108 was purchased from Fuka Co., and has a molecular formula of $EO_{132}PO_{60}EO_{132}$ and an average molecular weight, Mn, of 14600.

In the following examples and comparative examples, X-ray diffraction analysis was performed on an X-ray diffractometer model D8 Advance purchased from Bruker AXS, Germany; scanning electron microscope analysis was performed on a scanning electron microscope model XL-30 purchased from FEI, USA; pore structure parameter analysis was performed on an adsorption instrument model ASAP2020-M+C purchased from Micromeritics Co., USA; specific surface area and pore volume of the samples were calculated by using the BET method; particle size distribution value (SPAN) of the samples was obtained on a Malvern laser particle size analyzer (available from Malvin, UK); the rotary evaporator used was model RV10 digital produced by IKA company, German; the contents of individual components of the polyolefin catalyst component were determined on a wavelength-dispersion X-ray fluorescence spectrometer model Axios-Advanced purchased from Panaco of the Netherlands; and spray drying was carried out on a model B-290 spray dryer manufactured by Buchi, Switzerland.

The molecular weight distribution (Mw/Mn) of polyolefin powder was measured by using PL-GPC220 gel permeation chromatograph produced by Polymer Laboratories Ltd., British according to the method specified in ASTM D6474-99.

The melt index of polyolefin was determined by the method specified in ASTM D1238-99.

The particle size of the particulate material was measured by using a scanning electron microscope.

Example 1

This example is used to illustrate a polyolefin catalyst component and its preparation.

(1) Carrier Preparation 1.0 grams of triblock copolymer polyoxyethylene-polyoxypropylene-polyoxyethylene P123 and 1.69 grams of ethanol were added into 28 mL of a buffer solution of acetic acid and sodium acetate with a pH of 4.4, and stirred at 15° C. until the polyoxyethylene-polyoxypropylene-polyoxyethylene P123 was completely dissolved. Then, 6 grams of trimethylpentane were added into the above solution and, after stirring at 15° C. for 8 hours, 2.13 grams of tetramethoxysilane were added into the above solution. After stirring at 15° C. for 20 hours, the resultant solution was transferred into a polytetrafluoroethylene-lined reactor and allowed to crystallize at 60° C. for 24 hours, and the raw powder of an eggshell-like mesoporous material was then obtained through filtering, washing with deionized water and drying. The raw powder of the eggshell-like mesoporous material was calcined in a muffle furnace at 550° C. for 24 hours to remove the template agent, to obtain a template agent-removed eggshell-like mesoporous material A1 with a particle size between 3 and 22 μm. Then, the template agent-removed eggshell-like mesoporous material A1 was thermally activated by calcining under nitrogen atmosphere at 400° C. for 10h, to remove the hydroxyl group and residual moisture of the eggshell-like mesoporous material A1, thereby obtaining thermally activated eggshell-like mesoporous material B 1.

10 g of the above thermally activated eggshell-like mesoporous material B1 was taken into a 100 ml ball mill jar, with the material of the ball mill jar being polytetrafluoroethylene, the material of the milling balls being agate, the diameter of the milling balls being between 3 and 15 mm, and the number of the milling balls being 30 (including large balls (having a diameter greater than 11 mm), medium balls (having a diameter between 7 and 11 mm), and small balls (having a diameter less than 7 mm) in a number ratio of roughly 1:2:3). The ball mill jar was closed, and ball milling was performed at a temperature inside the ball mill jar of 25° C. and a rotary speed of the ball mill jar of 400 r/min for 12 hours, to obtain 10 g of milled eggshell-like mesoporous material carrier C1.

(2) Preparation of Polyolefin Catalyst Component

To a reactor equipped with a stirring device that had been purged with $N_2$ and maintained under $N_2$ atmosphere, 130 mL of tetrahydrofuran as electron donor solvent was added. The temperature of the reactor was controlled at 30° C., and 5.3 g of magnesium dichloride and 1 mL of titanium tetrachloride were quickly added when the stirring was turned on, and the system temperature was adjusted to 70° C. and maintained at that temperature for 4 hours to obtain a solution containing magnesium dichloride and titanium tetrachloride. The solution was cooled to 50° C., 6 g of the eggshell-like mesoporous material carrier C1 was added to the solution containing magnesium dichloride and titanium tetrachloride, and the resultant mixture was stirred for 2 hours to obtain a uniform slurry to be sprayed. Then, the obtained slurry to be sprayed was introduced into a spray dryer, where it was spray dried under $N_2$ atmosphere at a gas inlet temperature of 140° C., a gas outlet temperature of 105° C., and a carrying gas flow rate of 30 L/s, to obtain a polyolefin catalyst component designated as Cat-1.

The eggshell-like mesoporous material A1 and the polyolefin catalyst Cat-1 were characterized through XRD, scanning electron microscope, particle size analyzer and ASAP2020-M+C model nitrogen adsorption instrument.

Through X-ray fluorescence analysis, it was found that in the catalyst component Cat-1 obtained in this example, the magnesium content was 11.17% by weight and the titanium content was 2.55% by weight in terms of elements.

FIG. 1 is an XRD spectrum of the eggshell-like mesoporous material A1. It can be known from the small angle peaks appearing in the XRD spectrum that the eggshell-like mesoporous material carrier A1 has a 2D hexagonal channel structure peculiar to the mesoporous materials.

Figure 2A:
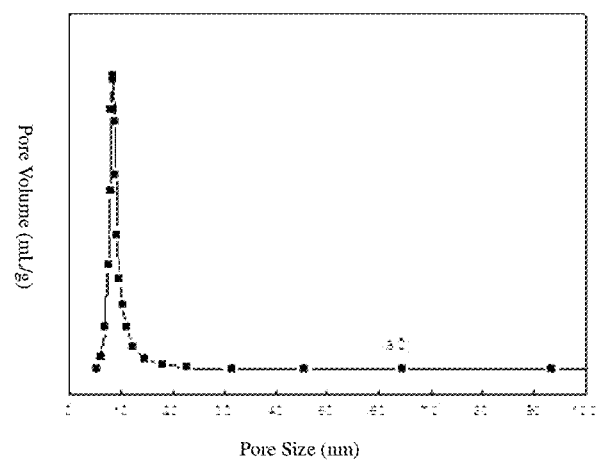
FIG. 2A is a pore size distribution curve of the eggshell-like mesoporous material A1 of Example 1.
Figure 2B:
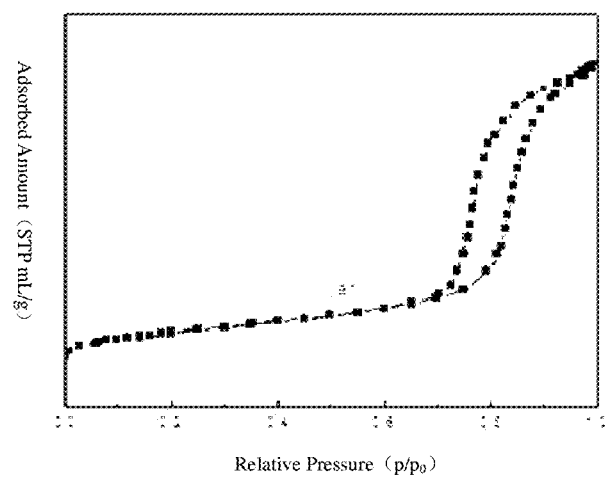
FIG. 2B is a nitrogen adsorption-desorption isotherm of the eggshell-like mesoporous material A1 of Example 1.

FIG. 2A is a pore size distribution curve of the eggshell-like mesoporous material A1, and FIG. 2B is a nitrogen adsorption-desorption isotherm of the eggshell-like mesoporous material A1. It can be seen from the pore size distribution curve and the nitrogen adsorption-desorption isotherm that the eggshell-like mesoporous material A1 has a sharp type IV isotherm of a capillary condensation rate and the isotherm has an H1 hysteresis loop, indicating that the sample has a uniform pore size distribution.

Figure 3A:
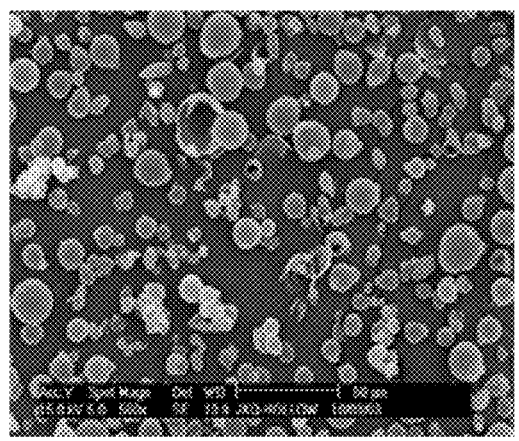
FIG. 3A is a scanning electron micrograph (500K magnification) of the eggshell-like mesoporous material A1 of Example 1.
Figure 3B:
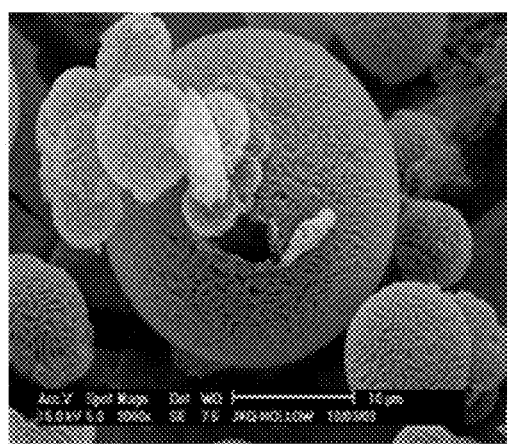
FIG. 3B is a scanning electron micrograph (3000K magnification) of the eggshell-like mesoporous material A1 of Example 1.
Figure 4:
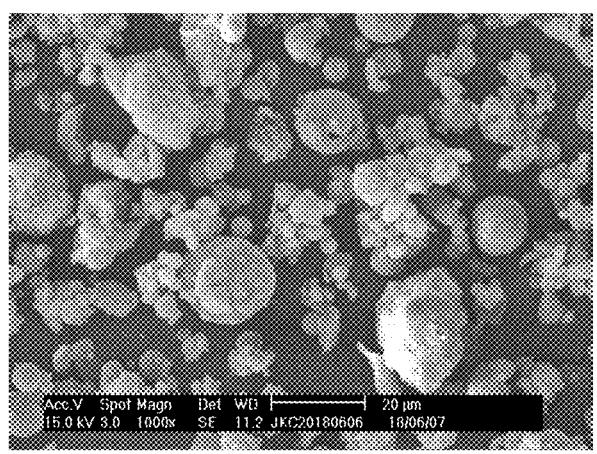
FIG. 4 is a scanning electron micrograph of the polyolefin catalyst Cat-1 of Example 1.

FIGS. 3A and 3B are scanning electron microscope (SEM) images of the eggshell-like mesoporous material A1 (magnifications are 500K and 3000K, respectively). It can be seen from the figures that the particle diameters of the sample are between 3 and 22 μm.

FIG. 3 is an SEM scanning electron micrograph of the polyolefin catalyst component Cat-1. It can be seen from the figure that the microscopic morphology of the polyolefin catalyst component Cat-1 is spherical and the particle diameters are in the order of microns, roughly in the range of 3-25 μm.

Table 1 shows the pore structure parameters of the eggshell-like mesoporous material A1 and the polyolefin catalyst Cat-1.

TABLE 1

| Sample | Specific Surface Area (m²/g) | Pore Volume (mL/g) | Average Pore Size (nm) | Particle Diameter (μm) | SPAN |
|---|---|---|---|---|---|
| Eggshell-like mesoporous material A1 | 261 | 0.8 | 9.8 | 3-22 | — |
| Catalyst component Cat-1 | 246 | 0.65 | 7.6 | 3-25 | 0.95 |

It can be seen from the data in Table 1 that after supporting the magnesium component and the titanium component on the eggshell-like mesoporous material A1, both the specific surface area and the pore volume are reduced, indicating that the magnesium component and the titanium enter inward the eggshell-like mesoporous material A1 during the supporting.

Example 2

This example is used to illustrate a polyolefin catalyst component of the invention and its preparation.
(1) Carrier Preparation 1.0 grams of triblock copolymer polyoxyethylene-polyoxypropylene-polyoxyethylene P123 and 1.84 grams of ethanol were added into 28 mL of a buffer solution of acetic acid and sodium acetate with a pH of 5, and stirred at 40° C. until the polyoxyethylene-polyoxypropylene-polyoxyethylene was completely dissolved. Then, 9.12 grams of trimethylpentane were added into the above solution and, after stirring at 40° C. for 6 hours, 3.04 grams of tetramethoxysilane were added into the above solution. After stirring at 40° C. for 15 hours, the resultant solution was transferred into a polytetrafluoroethylene-lined reactor and allowed to crystallize at 100° C. for 10 hours, and the raw powder of an eggshell-like mesoporous material was then obtained through filtering, washing and drying. The raw powder of the eggshell-like mesoporous material was calcined in a muffle furnace at 600° C. for 8 hours to remove the template agent, to obtain a template agent-removed eggshell-like mesoporous material A2 with a particle size in a range of from 3 to 12.5 μm. Then, the template agent-removed eggshell-like mesoporous material A2 was thermally activated by calcining under nitrogen atmosphere at 500° C. for 10h, to remove the hydroxyl group and residual moisture of the eggshell-like mesoporous material A2, thereby obtaining thermally activated eggshell-like mesoporous material B2.

10 g of the above thermally activated eggshell-like mesoporous material B2 was taken into a 100 ml ball mill jar, with the material of the ball mill jar being polytetrafluoroethylene, the material of the milling balls being agate, the diameter of the milling balls being in a range of from 3 to 15 mm, and the number of the milling balls being 30. The ball mill jar was closed, and ball milling was performed at a temperature inside the ball mill jar of 30° C. and a rotary speed of the ball mill jar of 300 r/min for 12 hours, to obtain 10 g of milled eggshell-like mesoporous material carrier C2.
(2) Preparation of Polyolefin Catalyst To a reactor equipped with a stirring device that had been purged with $N_2$ and maintained under $N_2$ atmosphere, 130 mL of tetrahydrofuran was added. The temperature of the reactor was controlled at 30° C., and 5.3 g of magnesium dichloride and 1 mL of titanium tetrachloride were quickly added when the stirring was turned on, and the system temperature was adjusted to 70° C. and maintained at that temperature for 4 hours to obtain a solution containing magnesium dichloride and titanium tetrachloride. The solution was cooled to 50° C., 3 g of the eggshell-like mesoporous material carrier C2 was added to the solution containing magnesium dichloride and titanium tetrachloride, and the resultant mixture was stirred for 2 hours to obtain a uniform slurry to be sprayed. Then, the obtained slurry to be sprayed was introduced into a spray dryer, where it was spray dried under $N_2$ atmosphere at a gas inlet temperature of 150° C., a gas outlet temperature of 110° C., and a carrying gas flow rate of 40 L/s, to obtain a polyolefin catalyst component designated as Cat-2.

The eggshell-like mesoporous material A2 and the polyolefin catalyst Cat-2 were characterized through XRD, scanning electron microscope, particle size analyzer and ASAP2020-M+C model nitrogen adsorption instrument.

Through X-ray fluorescence analysis, it was found that in the catalyst component Cat-2 obtained in this example, the magnesium content was 15.39% by weight and the titanium content was 3.12% by weight in terms of elements.

Table 2 shows the pore structure parameters of the eggshell-like mesoporous material A2 and the polyolefin catalyst component Cat-2.

TABLE 2

| Sample | Specific Surface Area (m²/g) | Pore Volume (mL/g) | Average Pore Size (nm) | Particle Diameter (μm) | SPAN |
|---|---|---|---|---|---|
| Eggshell-like mesoporous material A2 | 263 | 0.8 | 9.6 | 3-12.5 | — |
| Catalyst component Cat-2 | 237 | 0.68 | 7.4 | 3-15 | 0.85 |

It can be seen from the data in Table 2 that after supporting the magnesium component and the titanium component on the eggshell-like mesoporous material A2, both the specific surface area and the pore volume are reduced, indicating that the magnesium component and the titanium enter inward the eggshell-like mesoporous material A2 during the supporting.

Example 3

This example is used to illustrate the polyolefin catalyst of the invention and its preparation.
(1) Carrier Preparation 1.0 grams of triblock copolymer polyoxyethylene-polyoxypropylene-polyoxyethylene P123 and 2.76 grams of ethanol were added into 28 mL of a buffer solution of acetic acid and sodium acetate with a pH of 3, and stirred at 15° C. until the polyoxyethylene-polyoxypropylene-polyoxyethylene was completely dissolved. Then, 5.7 grams of trimethylpentane were added into the above solution and, after stirring at 15° C. for 8 hours, 2.13 grams of tetramethoxysilane were added into the above solution. After stirring at 40° C. for 10 hours, the resultant solution was transferred into a polytetrafluoroethylene-lined reactor and allowed to crystallize at 40° C. for 40 hours, and the raw powder of an eggshell-like mesoporous material was then obtained through filtering, washing and drying. The raw powder of the eggshell-like mesoporous material was calcined in a muffle furnace at 450° C. for 36 hours to remove the template agent, to obtain a template agent-removed eggshell-like mesoporous material A3 with a particle size in a range of from 5 to 16.2 μm. Then, the template agent-removed eggshell-like mesoporous material A3 was thermally activated by calcining under nitrogen atmosphere at 700° C. for 8h, to remove the hydroxyl group and residual moisture of the eggshell-like mesoporous material A3, thereby obtaining thermally activated eggshell-like mesoporous material B3.

10 g of the above thermally activated eggshell-like mesoporous material B3 was taken into a 100 ml ball mill jar, with the material of the ball mill jar being polytetrafluoroethylene, the material of the milling balls being agate, the diameter of the milling balls being in a range of from 3 to 15 mm, and the number of the milling balls being 30. The ball mill jar was closed, and ball milling was performed at a temperature inside the ball mill jar of 20° C. and a rotary speed of the ball mill jar of 550 r/min for 10 hours, to obtain 10 g of ball-milled eggshell-like mesoporous material carrier C3.

(2) Preparation of Polyolefin Catalyst Component

To a reactor equipped with a stirring device that had been purged with $N_2$ and maintained under $N_2$ atmosphere, 130 mL of tetrahydrofuran was added. The temperature of the reactor was controlled at 40° C., and 5.3 g of magnesium dichloride and 1 mL of titanium tetrachloride were quickly added when the stirring was turned on, and the system temperature was adjusted to 70° C. and maintained at that temperature for 4 hours to obtain a solution containing magnesium dichloride and titanium tetrachloride. 4.5 g of the eggshell-like mesoporous material carrier C3 was added to the solution containing magnesium dichloride and titanium tetrachloride at 40° C., and the resultant mixture was stirred for 2 hours to obtain a uniform slurry to be sprayed. Then, the obtained slurry to be sprayed was introduced into a spray dryer, where it was spray dried under $N_2$ atmosphere at a gas inlet temperature of 135° C., a gas outlet temperature of 105° C., and a carrying gas flow rate of 30 L/s, to obtain a polyolefin catalyst component designated as Cat-3.

The eggshell-like mesoporous material A3 and the polyolefin catalyst component Cat-3 were characterized through XRD, scanning electron microscope, particle size analyzer and ASAP2020-M+C model nitrogen adsorption instrument.

Through X-ray fluorescence analysis, it was found that in the catalyst component Cat-3 obtained in this example, the magnesium content was 12.76% by weight and the titanium content was 2.85% by weight in terms of elements.

Table 3 shows the pore structure parameters of the eggshell-like mesoporous material A3 and the polyolefin catalyst component Cat-3.

TABLE 3

| Sample | Specific Surface Area ($m^2$/g) | Pore Volume (mL/g) | Average Pore Size (nm) | Particle Diameter (μm) | SPAN |
|---|---|---|---|---|---|
| Eggshell-like mesoporous material A3 | 258 | 1.0 | 9.7 | 5-16.2 | — |
| Catalyst component Cat-3 | 237 | 0.82 | 7.4 | 5-18 | 0.9 |

It can be seen from the data in Table 3 that after supporting the magnesium component and the titanium component on the eggshell-like mesoporous material A3, both the specific surface area and the pore volume are reduced, indicating that the magnesium component and the titanium enter inward the eggshell-like mesoporous material A3 during the supporting.

Example 4

This example is used to illustrate the polyolefin catalyst component of the invention and its preparation.

A polyolefin catalyst component designated as Cat-4 was prepared according to the method of Example 2, except that 6.87 g of diethoxy magnesium was used instead of the 5.3 g of magnesium dichloride as a magnesium component, and 1.4 g of titanium trichloride was used instead of the 1 mL of titanium tetrachloride as a titanium component.

The eggshell-like mesoporous material A4 and the polyolefin catalyst component Cat-4 were characterized through XRD, scanning electron microscope and nitrogen adsorption instrument.

Through X-ray fluorescence analysis, it was found that in the catalyst component Cat-4 obtained in this example, the magnesium content was 21.43% by weight and the titanium content was 1.22% by weight in terms of elements.

Table 4 shows the pore structure parameters of the eggshell-like mesoporous material A4 and the polyolefin catalyst component Cat-4.

TABLE 4

| Sample | Specific Surface Area ($m^2$/g) | Pore Volume (mL/g) | Average Pore Size (nm) | Particle Diameter (μm) | SPAN |
|---|---|---|---|---|---|
| Eggshell-like mesoporous material A4 | 263 | 0.8 | 9.6 | 3-12.5 | — |
| Catalyst component Cat-4 | 224 | 0.55 | 7.2 | 3-15.5 | 0.85 |

It can be seen from the data in Table 4 that after supporting the magnesium component and the titanium component on the eggshell-like mesoporous material A4, both the specific surface area and the pore volume are reduced, indicating that the magnesium component and the titanium enter inward the eggshell-like mesoporous material A4 during the supporting.

Example 5

This example is used to illustrate the polyolefin catalyst component of the invention and its preparation, wherein the mesoporous material is treated with a chlorine-containing silane.

(1) Carrier Preparation

A thermally activated eggshell-like mesoporous material designated as B1 was obtained by following the procedure for preparing and thermally activating the eggshell-like mesoporous material as described in Example 1.

The thermally activated eggshell-like mesoporous material B1 was subjected to a ball milling treatment according to the procedure as described in Example 1, except that 1 g of dichlorodimethoxysilane was added together with the eggshell-like mesoporous material B1 into the 100 ml ball mill jar. As such, a silane-modified, ball-milled eggshell-like mesoporous material carrier C5 was obtained. Samples were characterized about contact angle and RDAX energy spectrum. The characterization results showed that the contact angle of the untreated mesoporous material sample was 20° and the contact angle of the mesoporous material after ball milling was 100°. The energy spectrum analysis showed that the untreated sample contained merely Si and O, while the modified mesoporous material sample contained C, Cl, Si and O.

(2) Preparation of Polyolefin Catalyst Component

A polyolefin catalyst component designated as Cat-5 was prepared by following the procedure as described in Example 1, except that the mesoporous material carrier C5 was used instead of the mesoporous material carrier C1.

Comparative Example 1

This comparative example is used to illustrate a comparative polyolefin catalyst component and its preparation.
(1) Carrier Preparation Commercially available silica gel (Cabot Corporation, grade TS610, having a particle size of 0.02-0.1 μm) was used as the carrier D1. The silica gel carrier D1 was calcined under nitrogen atmosphere at 400° C. for 10 hours to remove hydroxyl group and residual moisture, thereby obtaining a thermally activated silica gel carrier E1.
(2) Preparation of Polyolefin Catalyst Component A polyolefin catalyst component, designated as comparative catalyst component Cat-D-1, was prepared by following the procedure as described in Example 1, except that the same weight of the above activated silica gel carrier E1 was used instead of the eggshell-like mesoporous material carrier C1.

Through X-ray fluorescence analysis, it was found that in the catalyst component Cat-D-1 obtained in this example, the magnesium content was 15.3% by weight and the titanium content was 2.5% by weight in terms of elements.

Comparative Example 2

This comparative example is used to illustrate a comparative polyolefin catalyst component and its preparation.

A carrier D2 and a polyolefin catalyst component Cat-D-2 were prepared by following the procedure as described in Example 1, except that the same weight of alumina carrier was used instead of the eggshell-like mesoporous material carrier C1.

Through X-ray fluorescence analysis, it was found that in the catalyst component Cat-D-2 obtained in this example, the magnesium content was 14.6% by weight and the titanium content was 1.8% by weight in terms of elements.

Comparative Example 3

This comparative example is used to illustrate a comparative polyolefin catalyst component and its preparation.

A polyolefin catalyst was prepared by following the procedure as described in Example 1, except that the ball milling treatment and the spray drying were not used, but after the impregnation treatment the mixture was directly filtered, washed with n-hexane 4 times, and dried at 75° C. to obtain the polyolefin catalyst component Cat-D-3.

Through X-ray fluorescence analysis, it was found that in the catalyst Cat-D-3 obtained in this example, the magnesium content was 11.14% by weight and the titanium content was 1.12% by weight in terms of elements.

Working Example 1

This example is used to illustrate the method for preparing polyethylene by polymerizing ethylene using the polyolefin catalyst component of the present invention.

The atmosphere in a 2 L stainless steel polymerization autoclave was replaced with nitrogen three times and then with ethylene three times. 1 L of hexane, 1 mmol of triethylaluminum and about 20 mg of the catalyst component Cat-1 were added into the polymerization autoclave, then the temperature was raised to 85° C., hydrogen was added to 0.28 MPa, and then the total pressure of the system was maintained at 1.0 MPa with ethylene for polymerization. After the reaction had been carried out for 2 hours, the addition of ethylene was stopped, the temperature was lowered, and the pressure was released. The polyethylene powder was taken out for weighing, and the catalyst activity was calculated. The molecular weight distribution and melt index $MI_{2.16}$ of the polyethylene powder and the productivity of the catalyst were tested. The results are listed in Table 5.

Working Examples 2-5

Polymerizations of ethylene were carried out to prepare polyethylenes according to the method described in Working Example 1, except that the polyolefin catalyst components Cat-2 to Cat-5 were used instead of the polyolefin catalyst component Cat-1, respectively. The molecular weight distributions and melt indexes $MI_{2.16}$ of the resulting polyethylene particulate powders and catalyst productivities are listed in Table 5.

Working Comparative Examples 1-3

Polymerizations of ethylene were carried out to prepare polyethylenes according to the method described in Working Example 1, except that the polyolefin catalyst components Cat-D-1 to Cat-D-3 were used instead of the polyolefin catalyst component Cat-1, respectively. The molecular weight distributions and melt indexes $MI_{2.16}$ of the resulting polyethylene particulate powders and catalyst productivities are listed in Table 5.

TABLE 5

| Example No. | Molecular weight distribution of polymer powder (Mw/Mn) | Melt index $MI_{2.16}$ (g/10 min) | Catalyst productivity (g PE/ gcat · h) |
|---|---|---|---|
| Working Example 1 | 3.3 | 1.56 | 9500 |
| Working Example 2 | 4.12 | 1.64 | 17156 |
| Working Example 3 | 4.36 | 1.35 | 9033 |
| Working Example 4 | 4.75 | 0.95 | 8015 |
| Working Example 5 | 4.0 | 1.5 | 19000 |
| Working Comparative Example 1 | 6.3 | 1.05 | 6100 |
| Working Comparative Example 2 | 7.2 | 0.06 | 6300 |
| Working Comparative Example 3 | 5.64 | 0.11 | 1235 |

It can be seen from the results in Table 5 that the polyolefin catalyst components prepared by supporting the titanium component and the magnesium component on the eggshell-like mesoporous material carrier have high catalytic activities, large melt indexes of polymer powder, and narrow molecular weight distributions of polymer powder. Moreover, when the catalyst components of the present invention are used to catalyze the polymerization of ethylene, the resulting polymers have good particle morphology and excellent flowability. In addition, by utilizing the method of the present invention to prepare a supported catalyst, spherical polyolefin catalyst component can be directly obtained in one step by the spray drying process, and the operation is simple and convenient.

Example 6

This example is used to illustrate the polyolefin catalyst component of the invention and its preparation.
(1) Carrier Preparation 2 grams of template agent F127 were added into a solution containing 2.9 g of 37 wt % hydrochloric acid and 56 g of water, and stirred at 40° C. until the F127 was completely dissolved. Then, 8.2 g (0.04 mol) of ethyl orthosilicate was added to the above solution and, after stirring at 40° C. for 45 min, the resultant solution was transferred into a polytetrafluoroethylene-lined reactor and allowed to crystallize at 100° C. for 24 hours, and a raw powder of a mesoporous material with a body-centered cubic structure was then obtained through filtering, washing with deionized water 4 times, suction filtering and drying. The raw powder of the mesoporous material with body-centered cubic structure was calcined in a muffle furnace at 400° C. for 10 hours to remove the template agent, to obtain a template agent-removed spherical mesoporous silica A6 with a particle size ranging from 3 to 9 μm. Then, the template agent-removed spherical mesoporous silica A6 was thermally activated by calcining under nitrogen atmosphere at 400° C. for 10h to remove the hydroxyl group and residual moisture on the surface of the spherical mesoporous silica A6, thereby obtaining thermally activated spherical mesoporous silica B6.

10 g of the above thermally activated spherical mesoporous silica B6 was taken into a 100 ml ball mill jar, with the material of the ball mill jar being polytetrafluoroethylene, the material of the milling balls being agate, the diameters of the milling balls ranging from 3 to 15 mm, and the number of the milling balls being 30. The ball mill jar was closed, and ball milling was performed at a temperature inside the ball mill jar of 25° C. and a rotary speed of the ball mill jar of 400 r/min for 12 hours, to obtain ball-milled spherical mesoporous silica carrier C6.
(2) Preparation of Polyolefin Catalyst Component To a reactor equipped with a stirring device that had been purged with $N_2$ and maintained under $N_2$ atmosphere, 130 mL of tetrahydrofuran as an electron donor solvent was added. The temperature of the reactor was controlled at 30° C., and 5.3 g of magnesium dichloride and 1 mL of titanium tetrachloride were quickly added when the stirring was turned on, and the system temperature was adjusted to 70° C. and maintained at that temperature for 4 hours to obtain a solution containing magnesium dichloride and titanium tetrachloride. The solution was cooled to 50° C., 6 g of the spherical mesoporous silica carrier C6 was added to the solution containing magnesium dichloride and titanium tetrachloride, and the resultant mixture was stirred for 2 hours to obtain a uniform slurry to be sprayed. Then, the obtained slurry to be sprayed was introduced into a spray dryer, where it was spray dried under $N_2$ atmosphere at a gas inlet temperature of 140° C., a gas outlet temperature of 105° C., and a carrying gas flow rate of 30 L/s, to obtain a polyolefin catalyst component designated as Cat-6.

The spherical mesoporous silica A6 and the polyolefin catalyst component Cat-6 were characterized through XRD, scanning electron microscope, particle size analyzer and ASAP2020-M+C model nitrogen adsorption instrument.

Through X-ray fluorescence analysis, it was found that in the catalyst component Cat-6 obtained in this example, the magnesium content was 12.54% by weight and the titanium content was 2.95% by weight in terms of elements.

Figure 5:
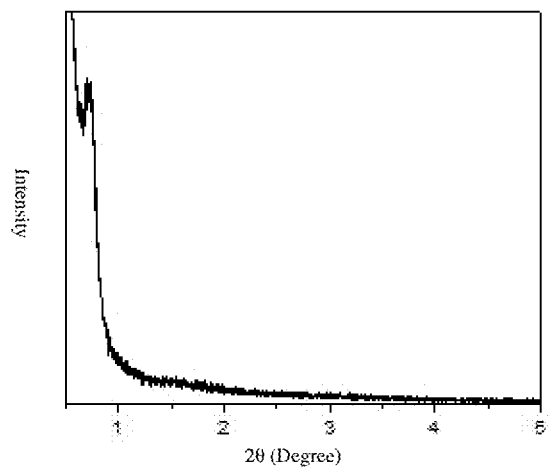
FIG. 5 is an X-ray diffraction (XRD) spectrum of the spherical mesoporous silica A6 of Example 6.

FIG. 5 is an X-ray diffraction (XRD) spectrum of the spherical mesoporous silica A6, in which the abscissa is 2θ and the ordinate is intensity. It can be known from the small angle peaks appearing in the XRD spectrum that the spherical mesoporous silica A6 has a body-centered cubic channel structure peculiar to the mesoporous material SBA-16.

Figure 6:
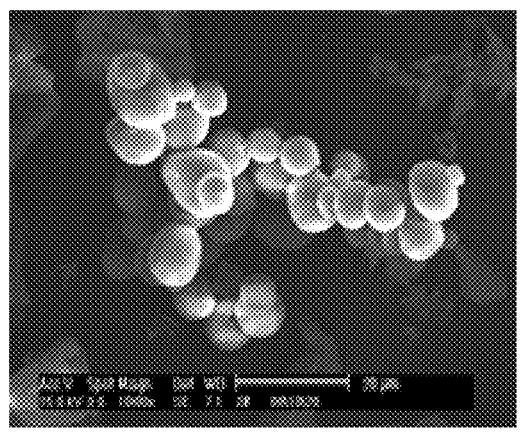
FIG. 6 is a scanning electron micrograph of the spherical mesoporous silica A6 of Example 6.

FIG. 6 is a scanning electron microscope (SEM) image of the spherical mesoporous silica A6. It can be seen from the figure that the spherical mesoporous silica A6 is of microsphere with a particle size of 3-9 μm, and its monodispersity is good.

Figure 7:
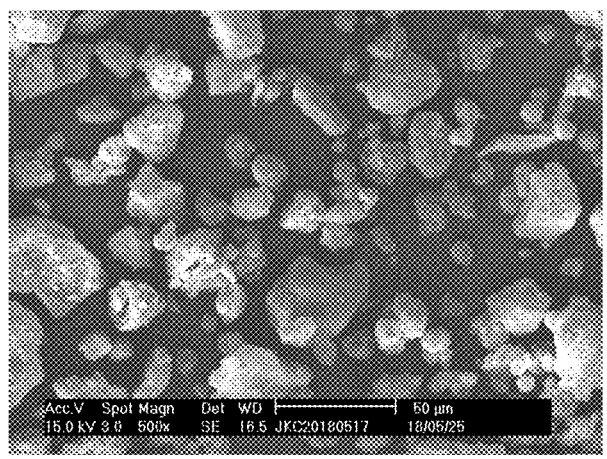
FIG. 7 is a scanning electron micrograph of the polyolefin catalyst Cat-6 prepared in Example 6.

FIG. 7 is a scanning electron micrograph of the polyolefin catalyst component Cat-6. It can be seen from the figure that the polyolefin catalyst component Cat-6 is spherical and the particle diameters are in the order of microns.

Table 6 shows the pore structure parameters of the spherical mesoporous silica A6 and the polyolefin catalyst component Cat-6.

TABLE 6

| Sample | Specific surface area (m²/g) | Pore volume (mL/g) | Average pore size (nm) | Particle diameter (μm) | SPAN |
|---|---|---|---|---|---|
| Spherical mesoporous silica A6 | 800 | 0.6 | 3 | 3-9 | — |
| Catalyst component Cat-6 | 767 | 0.5 | 2.2 | 3-15 | 0.9 |

It can be seen from the data in Table 6 that after supporting the magnesium component and the titanium component on the spherical mesoporous silica A6, both the specific surface area and the pore volume are reduced, indicating that the magnesium component and the titanium component enter inward the spherical mesoporous silica A1 during the supporting.

Example 7

This example is used to illustrate the polyolefin catalyst component of the invention and its preparation.
(1) Carrier Preparation 2 grams of template agent F127 were added into a solution containing 2.9 g of 37 wt % hydrochloric acid and 56 g of water, and stirred at 40° C. until the F127 was completely dissolved. Then, 9.09 g (0.044 mol) of ethyl orthosilicate was added to the above solution and, after stirring at 60° C. for 20h, the resultant solution was transferred into a polytetrafluoroethylene-lined reactor and allowed to crystallize at 120° C. for 20 hours, and a raw powder of a mesoporous material with a body-centered cubic structure was then obtained through filtering, washing with deionized water 4 times, suction filtering and drying. The raw powder of the mesoporous material with body-centered cubic structure was calcined in a muffle furnace at 500° C. for 15 hours to remove the template agent, to obtain a template agent-removed spherical mesoporous silica A7 with a particle size ranging from 4 to 8 μm. Then, the template agent-removed spherical mesoporous silica A7 was thermally activated by calcining under nitrogen atmosphere at 500° C. for 10h to remove the hydroxyl group and residual moisture on the surface of the spherical mesoporous silica A7, thereby obtaining thermally activated spherical mesoporous silica B7.

10 g of the above thermally activated spherical mesoporous silica B7 was taken into a 100 ml ball mill jar, with the material of the ball mill jar being polytetrafluoroethylene, the material of the milling balls being agate, the diameters of the milling balls ranging from 3 to 15 mm, and the number of the milling balls being 30. The ball mill jar was closed, and ball milling was performed at a temperature inside the ball mill jar of 30° C. and a rotary speed of the ball mill jar of 300 r/min for 12 hours, to obtain ball-milled spherical mesoporous silica carrier C7.

(2) Preparation of Polyolefin Catalyst Component

To a reactor equipped with a stirring device that had been purged with $N_2$ and maintained under $N_2$ atmosphere, 130 mL of tetrahydrofuran was added. The temperature of the reactor was controlled at 30° C., and 5.3 g of magnesium dichloride and 1 mL of titanium tetrachloride were quickly added when the stirring was turned on, and the system temperature was adjusted to 70° C. and maintained at that temperature for 4 hours to obtain a solution containing magnesium dichloride and titanium tetrachloride. The solution was cooled to 50° C., 3 g of the spherical mesoporous silica carrier C7 was added to the solution containing magnesium dichloride and titanium tetrachloride, and the resultant mixture was stirred for 2 hours to obtain a uniform slurry to be sprayed. Then, the obtained slurry to be sprayed was introduced into a spray dryer, where it was spray dried under $N_2$ atmosphere at a gas inlet temperature of 150° C., a gas outlet temperature of 110° C., and a carrying gas flow rate of 40 L/s, to obtain a polyolefin catalyst component designated as Cat-7.

The spherical mesoporous silica A7 and the polyolefin catalyst Cat-7 were characterized through XRD, scanning electron microscope, particle size analyzer and ASAP2020-M+C model nitrogen adsorption instrument.

Through X-ray fluorescence analysis, it was found that in the catalyst component Cat-7 obtained in this example, the magnesium content was 18.73% by weight and the titanium content was 4.47% by weight in terms of elements.

Table 7 shows the pore structure parameters of the spherical mesoporous silica A7 and the polyolefin catalyst component Cat-7.

TABLE 7

| Sample | Specific surface area ($m^2$/g) | Pore volume (mL/g) | Average pore size (nm) | Particle diameter (μm) | SPAN |
|---|---|---|---|---|---|
| Spherical mesoporous silica A7 | 810 | 0.7 | 3.2 | 4-8 | — |
| Catalyst component Cat-7 | 763 | 0.5 | 2.5 | 4-12.5 | 0.92 |

It can be seen from the data in Table 7 that after supporting the magnesium component and the titanium component on the spherical mesoporous silica A7, both the specific surface area and the pore volume are reduced, indicating that the magnesium component and the titanium component enter inward the spherical mesoporous silica A7 during the supporting.

Example 8

This example is used to illustrate the polyolefin catalyst component of the invention and its preparation.

(1) Carrier Preparation 2 grams of template agent F127 were added into a solution containing 2.9 g of 37 wt % hydrochloric acid and 56 g of water, and stirred at 40° C. until the F127 was completely dissolved. Then, 7.44 g (0.036 mol) of ethyl orthosilicate was added to the above solution and, after stirring at 50° C. for 24h, the resultant solution was transferred into a polytetrafluoroethylene-lined reactor and allowed to crystallize at 90° C. for 36 hours, and a raw powder of a mesoporous material with a body-centered cubic structure was then obtained through filtering, washing with deionized water 4 times, suction filtering and drying. The raw powder of the mesoporous material with body-centered cubic structure was calcined in a muffle furnace at 500° C. for 15 hours to remove the template agent, to obtain a template agent-removed spherical mesoporous silica A8 with a particle size ranging from 3.5 to 8.5 μm. Then, the template agent-removed spherical mesoporous silica A8 was thermally activated by calcining under nitrogen atmosphere at 700° C. for 8h to remove the hydroxyl group and residual moisture on the surface of the spherical mesoporous silica A8, thereby obtaining thermally activated spherical mesoporous silica B8.

10 g of the above thermally activated spherical mesoporous silica B8 was taken into a 100 ml ball mill jar, with the material of the ball mill jar being polytetrafluoroethylene, the material of the milling balls being agate, the diameters of the milling balls ranging from 3 to 15 mm, and the number of the milling balls being 30. The ball mill jar was closed, and ball milling was performed at a temperature inside the ball mill jar of 20° C. and a rotary speed of the ball mill jar of 550 r/min for 10 hours, to obtain ball-milled spherical mesoporous silica carrier C8.

(2) Preparation of Polyolefin Catalyst Component

To a reactor equipped with a stirring device that had been purged with $N_2$ and maintained under $N_2$ atmosphere, 130 mL of tetrahydrofuran was added. The temperature of the reactor was controlled at 40° C., and 5.3 g of magnesium dichloride and 1 mL of titanium tetrachloride were quickly added when the stirring was turned on, and the system temperature was adjusted to 70° C. and maintained at that temperature for 4 hours to obtain a solution containing magnesium dichloride and titanium tetrachloride. 4.5 g of the spherical mesoporous silica carrier C8 was added to the solution containing magnesium dichloride and titanium tetrachloride at 40° C., and the resultant mixture was stirred for 2 hours to obtain a uniform slurry to be sprayed. Then, the obtained slurry to be sprayed was introduced into a spray dryer, where it was spray dried under $N_2$ atmosphere at a gas inlet temperature of 135° C., a gas outlet temperature of 105° C., and a carrying gas flow rate of 30 L/s, to obtain a polyolefin catalyst component designated as Cat-8.

The spherical mesoporous silica A8 and the polyolefin catalyst component Cat-8 were characterized through XRD, scanning electron microscope, particle size analyzer and ASAP2020-M+C model nitrogen adsorption instrument.

Through X-ray fluorescence analysis, it was found that in the catalyst component Cat-8 obtained in this example, the magnesium content was 13.09% by weight and the titanium content was 3.60% by weight in terms of elements.

Table 8 shows the pore structure parameters of the spherical mesoporous silica A8 and the polyolefin catalyst component Cat-8.

TABLE 8

| Sample | Specific surface area (m²/g) | Pore volume (mL/g) | Average pore size (nm) | Particle diameter (μm) | SPAN |
|---|---|---|---|---|---|
| Spherical mesoporous silica A8 | 795 | 0.65 | 3.5 | 3.5-8.5 | — |
| Catalyst component Cat-8 | 751 | 0.52 | 2.4 | 3.5-13 | 0.85 |

It can be seen from the data in Table 8 that after supporting the magnesium component and the titanium component on the spherical mesoporous silica A8, both the specific surface area and the pore volume are reduced, indicating that the magnesium component and the titanium component enter inward the spherical mesoporous silica A8 during the supporting.

Example 9

This example is used to illustrate the polyolefin catalyst component of the invention and its preparation.

A polyolefin catalyst component designated as Cat-9 was prepared by following the procedure as described in Example 7, except that 6.87 g of diethoxy magnesium was used instead of the 5.3 g of magnesium dichloride as a magnesium component, and 1.4 g of titanium trichloride was used instead of the 1 mL of titanium tetrachloride as a titanium component.

The spherical mesoporous silica A9 and the polyolefin catalyst Cat-9 were characterized through XRD, scanning electron microscope and nitrogen adsorption instrument.

Through X-ray fluorescence analysis, it was found that in the catalyst component Cat-9 obtained in this example, the magnesium content was 22.32% by weight and the titanium content was 1.25% by weight in terms of elements.

Table 9 shows the pore structure parameters of the spherical mesoporous silica A9 and the polyolefin catalyst component Cat-9.

TABLE 9

| Sample | Specific surface area (m²/g) | Pore volume (mL/g) | Average pore size (nm) | Particle diameter (μm) | SPAN |
|---|---|---|---|---|---|
| Spherical mesoporous silica A9 | 810 | 0.7 | 3.2 | 4-8 | — |
| Catalyst component Cat-9 | 749 | 0.5 | 2.4 | 4-15 | 0.92 |

It can be seen from the data in Table 9 that after supporting the magnesium component and the titanium component on the spherical mesoporous silica A9, both the specific surface area and the pore volume are reduced, indicating that the magnesium component and the titanium component enter inward the spherical mesoporous silica A9 during the supporting.

Example 10

This example is used to illustrate the polyolefin catalyst component of the invention and its preparation, wherein the mesoporous material carrier is modified with a chlorine-containing silane.

(1) Carrier Preparation

A thermally activated spherical mesoporous silica material B10 was obtained by following the procedure for preparing and thermally activating a spherical mesoporous silica material as described in Example 6.

The thermally activated mesoporous material B10 was subjected to a ball milling treatment according to the procedure as described in Example 6, except that 1 g of dichlorodimethoxysilane was added together with the mesoporous material B10 into the 100 ml ball mill jar. As such, a silane-modified, ball-milled spherical mesoporous silica material carrier C10 was obtained. Samples were characterized about contact angle and RDAX energy spectrum. The characterization results showed that the contact angle of the untreated mesoporous material sample was 21° and the contact angle of the mesoporous material after ball milling was 102°. The energy spectrum analysis showed that the untreated sample contained merely Si and O, while the modified mesoporous material sample contained C, Cl, Si and O.

(2) Preparation of Polyolefin Catalyst Component

A polyolefin catalyst component designated as Cat-10 was prepared by following the procedure as described in Example 6, except that the mesoporous material carrier C10 was used instead of the mesoporous material carrier C6.

Comparative Example 4

This comparative example is used to illustrate a comparative polyolefin catalyst component and its preparation.

A polyolefin catalyst component was prepared by following the procedure as described in Example 6, except that the ball milling treatment and the spray drying were not used, but after the impregnation treatment the mixture was directly filtered, washed with n-hexane 4 times, and dried at 75° C. to obtain the polyolefin catalyst component Cat-D-4.

Through X-ray fluorescence analysis, it was found that in the catalyst component Cat-D-4 obtained in this example, the magnesium content was 11.2% by weight and the titanium content was 1.3% by weight in terms of elements.

Working Example 6

This example is used to illustrate the method for preparing polyethylene by polymerizing ethylene using the polyolefin catalyst component of the present invention.

The atmosphere in a 2 L stainless steel polymerization autoclave was replaced with nitrogen three times and then with ethylene three times. 1 L of hexane, 1 mmol of triethylaluminum and about 20 mg of the catalyst component Cat-6 were added into the polymerization autoclave, then the temperature was raised to 85° C., hydrogen was added to 0.28 MPa, and then the total pressure of the system was maintained at 1.0 MPa with ethylene for polymerization. After the reaction had been carried out for 2 hours, the addition of ethylene was stopped, the temperature was lowered, and the pressure was released. A polyethylene powder was taken out for weighing, and the catalyst activity was calculated. The molecular weight distribution and melt index $MI_{2.16}$ of the polyethylene powder and the productivity of the catalyst were tested. The results are listed in Table 10.

Working Examples 7-10

Polymerizations of ethylene were carried out to prepare polyethylenes according to the method described in Working Example 6, except that the polyolefin catalyst components Cat-7 to Cat-10 were used instead of the polyolefin catalyst component Cat-6, respectively. The molecular weight distributions and melt indexes $MI_{2.16}$ of the resulting polyethylene particulate powders and catalyst productivities are listed in Table 10.

Working Comparative Example 4

Polymerization of ethylene was carried out to prepare polyethylene according to the method described in Working Example 6, except that the polyolefin catalyst component Cat-D-4 was used instead of the polyolefin catalyst component Cat-6. The molecular weight distribution and melt index $MI_{2.16}$ of the resulting polyethylene particulate powder and catalyst productivity are listed in Table 10.

TABLE 10

| Example No. | Polymerization powder molecular weight distribution (Mw/Mn) | Melt index $MI_{2.16}$ (g/10 min) | Catalyst Productivity (g PE/ gcat · h) |
|---|---|---|---|
| Working Example 6 | 3.8 | 1.69 | 11000 |
| Working Example 7 | 4.25 | 1.58 | 17362 |
| Working Example 8 | 4.5 | 1.46 | 9136 |
| Working Example 9 | 4.88 | 0.97 | 8124 |
| Working Example 10 | 3.95 | 1.4 | 19500 |
| Working Comparative Example4 | 5.85 | 0.13 | 1196 |

It can be seen from the results in Table 10 that the polyolefin catalyst components prepared by supporting the titanium component and the magnesium component on the spherical mesoporous silica carriers have high catalytic activities, large melt indexes of polymer powder, and narrow molecular weight distributions of polymer powder. Moreover, when the catalyst components of the present invention are used to catalyze the polymerization of ethylene, the resulting polymers have good particle morphology and excellent flowability. In addition, by utilizing the method of the present invention to prepare a supported catalyst, spherical polyolefin catalyst component can be directly obtained in one step by the spray drying process, and the operation is simple and convenient.

Example 11

This example is used to illustrate the polyolefin catalyst component of the invention and its preparation.
(1) Carrier Preparation 4 g (0.0007 mol) of template agent P123 was added into a solution containing 16.4 mL of 37 wt % hydrochloric acid and 128 mL of water, and stirred at 40° C. until the P123 was completely dissolved. Then, 8.86 g (0.042 mol) of ethyl orthosilicate was added to the above solution and, after stirring at 40° C. for 24h, the resultant solution was transferred into a polytetrafluoroethylene-lined reactor and allowed to crystallize at 150° C. for 24 hours, and a raw powder of a mesoporous material was then obtained through filtering, washing with deionized water 4 times, suction filtering and drying. The raw powder of the mesoporous material was washed with ethanol under reflux conditions for 24 hours to remove the template agent, to obtain a mesoporous molecular sieve A11. Then, the template agent-removed product was thermally activated by calcining under nitrogen atmosphere at 400° C. for 10h to remove the hydroxyl group and residual moisture on the surface of the mesoporous material, thereby obtaining thermally activated mesoporous material B11.

10 g of the above thermally activated mesoporous material B11 was taken into a 100 ml ball mill jar, with the material of the ball mill jar being polytetrafluoroethylene, the material of the milling balls being agate, the diameters of the milling balls ranging from 3 to 15 mm, and the number of the milling balls being 30. The ball mill jar was closed, and ball milling was performed at a temperature inside the ball mill jar of 25° C. and a rotary speed of the ball mill jar of 400 r/min for 12 hours, to obtain ball-milled mesoporous material carrier C11.

(2) Preparation of Polyolefin Catalyst Component

To a reactor equipped with a stirring device that had been purged with $N_2$ and maintained under $N_2$ atmosphere, 140 mL of tetrahydrofuran as an electron donor solvent was added. The temperature of the reactor was controlled at 30° C., 6 g of magnesium dichloride and 1.1 mL of titanium tetrachloride were quickly added when the stirring was turned on, and the system temperature was adjusted to 70° C. and maintained at that temperature for 4 hours to obtain a solution containing magnesium dichloride and titanium tetrachloride. The solution was cooled to 50° C., 6.8 g of the mesoporous material carrier C11 was added to the solution containing magnesium dichloride and titanium tetrachloride, and the resultant mixture was stirred for 2 hours to obtain a uniform slurry to be sprayed. Then, the obtained slurry to be sprayed was introduced into a spray dryer, where it was spray dried under $N_2$ atmosphere at a gas inlet temperature of 140° C., a gas outlet temperature of 105° C., and a carrying gas flow rate of 30 L/s, to obtain a polyolefin catalyst component designated as Cat-11.

The mesoporous material carrier C11 and the polyolefin catalyst component Cat-11 were characterized through XRD, scanning electron microscope, particle size analyzer and nitrogen adsorption instrument.

Through X-ray fluorescence analysis, it was found that in the catalyst component Cat-11 obtained in this example, the magnesium content was 12.34% by weight and the titanium content was 2.16% by weight in terms of elements.

Figure 8:
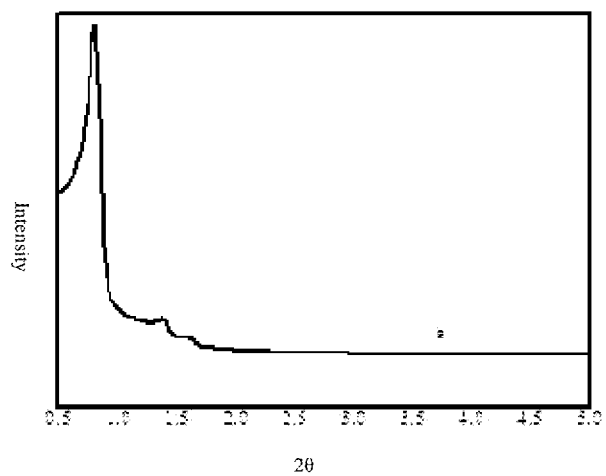
FIG. 8 is an X-ray diffraction spectrum of the mesoporous molecular sieve of Example 11.

FIG. 8 shows the XRD spectrum, a, of the mesoporous molecular sieve A11, in which the abscissa is 2θ and the ordinate is intensity. It can be clearly seen from the XRD spectrum that the mesoporous molecular sieve A11 exhibits a diffraction peak in the small angle region, indicating that the mesoporous molecular sieve A11 has a two-dimensionally ordered hexagonal channel structure peculiar to the mesoporous material SBA-15.

Figure 9:
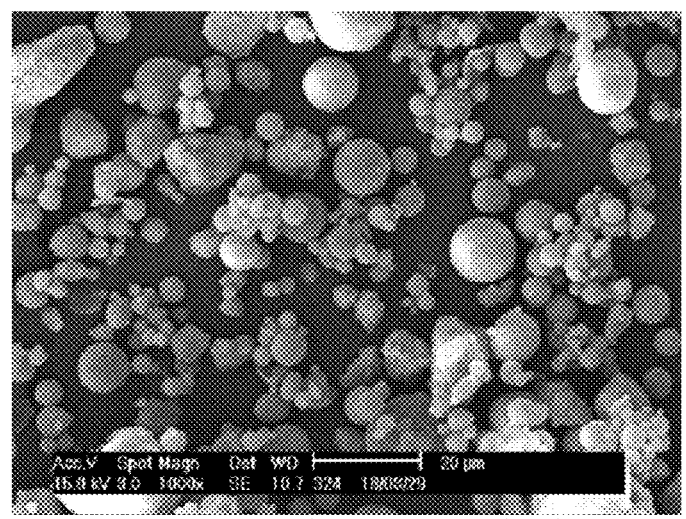
FIG. 9 is a scanning electron micrograph of the polyolefin catalyst component prepared in Example 11.

FIG. 9 is a scanning electron micrograph of the polyolefin catalyst component Cat-11. It can be seen from the figure that the microscopic morphology of the polyolefin catalyst component Cat-11 is spherical and the particle diameters are in the order of microns.

Table 11 shows the pore structure parameters of the mesoporous material carrier C11 and the polyolefin catalyst component Cat-11.

TABLE 11

| Sample | Specific surface area (m²/g) | Pore volume (mL/g) | Average pore size (nm) | Particle diameter (μm) | SPAN |
|---|---|---|---|---|---|
| Carrier C11 | 598 | 0.7 | 4.8 | 1-10 | — |
| Catalyst component Cat-11 | 567 | 0.6 | 4.4 | 1-15 | 1.73 |

It can be seen from the data in Table 11 that after supporting the magnesium component and the titanium component on the mesoporous material carrier C11, both the specific surface area and the pore volume are reduced, indicating that the magnesium component and the titanium component enter inward the mesoporous material carrier C11.

Example 12

This example is used to illustrate the polyolefin catalyst component of the invention and its preparation.
(1) Carrier Preparation 4 g (0.0007 mol) of template agent P123 was added into a solution containing 16.4 mL of 37 wt % hydrochloric acid and 128 mL of water, and stirred at 40° C. until the P123 was completely dissolved. Then, 10.9 g (0.0525 mol) of ethyl orthosilicate was added to the above solution and, after stirring at 40° C. for 24h, the resultant solution was transferred into a polytetrafluoroethylene-lined reactor and allowed to crystallize at 180° C. for 20 hours, and a raw powder of a mesoporous material was then obtained through filtering, washing with deionized water 4 times, suction filtering and drying. The raw powder of the mesoporous material was washed with ethanol under reflux conditions for 24 hours to remove the template agent, to obtain a mesoporous molecular sieve material A12. Then, the template agent-removed product was thermally activated by calcining under nitrogen atmosphere at 500° C. for 10h to remove the hydroxyl group and residual moisture on the surface of the mesoporous material, thereby obtaining thermally activated mesoporous material B12.

10 g of the above thermally activated mesoporous material B12 was taken into a 100 ml ball mill jar, with the material of the ball mill jar being polytetrafluoroethylene, the material of the milling balls being agate, the diameters of the milling balls ranging from 3 to 15 mm, and the number of the milling balls being 30. The ball mill jar was closed, and ball milling was performed at a temperature inside the ball mill jar of 30° C. and a rotary speed of the ball mill jar of 300 r/min for 12 hours, to obtain ball-milled mesoporous material carrier C12.
(2) Preparation of Polyolefin Catalyst Component To a reactor equipped with a stirring device that had been purged with $N_2$ and maintained under $N_2$ atmosphere, 140 mL of tetrahydrofuran was added. The temperature of the reactor was controlled at 30° C., 6 g of magnesium dichloride and 1.1 mL of titanium tetrachloride were quickly added when the stirring was turned on, and the system temperature was adjusted to 70° C. and maintained at that temperature for 4 hours to obtain a solution containing magnesium dichloride and titanium tetrachloride. The solution was cooled to 50° C., 3.5 g of the mesoporous material carrier C12 was added to the solution containing magnesium dichloride and titanium tetrachloride, and the resultant mixture was stirred for 2 hours to obtain a uniform slurry to be sprayed. Then, the obtained slurry to be sprayed was introduced into a spray dryer, where it was spray dried under $N_2$ atmosphere at a gas inlet temperature of 150° C., a gas outlet temperature of 110° C., and a carrying gas flow rate of 40 L/s, to obtain a polyolefin catalyst component designated as Cat-12.

The mesoporous material carrier C12 and the polyolefin catalyst component Cat-12 were characterized through XRD, scanning electron microscope, particle size analyzer and nitrogen adsorption instrument.

Through X-ray fluorescence analysis, it was found that in the catalyst component Cat-12 obtained in this example, the magnesium content was 10.53% by weight and the titanium content was 2.18% by weight in terms of elements.

Table 12 shows the pore structure parameters of the mesoporous material carrier C12 and the polyolefin catalyst component Cat-12.

TABLE 12

| Sample | Specific surface area (m²/g) | Pore volume (mL/g) | Average pore size (nm) | Particle diameter (μm) | SPAN |
|---|---|---|---|---|---|
| Carrier C12 | 583 | 0.9 | 5.3 | 0.9-9 | — |
| Catalyst component Cat-12 | 562 | 0.7 | 4.7 | 0.9-15 | 1.78 |

It can be seen from the data in Table 12 that after supporting the magnesium component and the titanium component on the mesoporous material carrier C12, both the specific surface area and the pore volume are reduced, indicating that the magnesium component and the titanium component enter inward the mesoporous material carrier C12.

Example 13

This example is used to illustrate the polyolefin catalyst component of the invention and its preparation.
(1) Carrier Preparation 4 g (0.0007 mol) of template agent P123 was added into a solution containing 16.4 mL of 37 wt % hydrochloric acid and 128 mL of water, and stirred at 40° C. until the P123 was completely dissolved. Then, 7.27 g (0.035 mol) of ethyl orthosilicate was added to the above solution and, after stirring at 50° C. for 20h, the resultant solution was transferred into a polytetrafluoroethylene-lined reactor and allowed to crystallize at 175° C. for 22 hours, and a raw powder of a mesoporous material was then obtained through filtering, washing with deionized water 4 times, suction filtering and drying. The raw powder of the mesoporous material was washed with ethanol under reflux conditions for 24 hours to remove the template agent, to obtain a mesoporous molecular sieve material A13. Then, the template agent-removed product was thermally activated by calcining under nitrogen atmosphere at 700° C. for 8h to remove the hydroxyl group and residual moisture of the mesoporous material, thereby obtaining thermally activated mesoporous material B13.

10 g of the above thermally activated mesoporous material B13 was taken into a 100 ml ball mill jar, with the material of the ball mill jar being polytetrafluoroethylene, the material of the milling balls being agate, the diameters of the milling balls ranging from 3 to 15 mm, and the number of the milling balls being 30. The ball mill jar was closed, and ball milling was performed at a temperature inside the ball mill jar of 20° C. and a rotary speed of the ball mill jar of 550 r/min for 10 hours, to obtain ball-milled mesoporous material carrier C13.

(2) Preparation of Polyolefin Catalyst Component

To a reactor equipped with a stirring device that had been purged with $N_2$ and maintained under $N_2$ atmosphere, 140 mL of tetrahydrofuran was added. The temperature of the reactor was controlled at 40° C., 6 g of magnesium dichloride and 1.1 mL of titanium tetrachloride were quickly added when the stirring was turned on, and the system temperature was adjusted to 70° C. and maintained at that temperature for 4 hours to obtain a solution containing magnesium dichloride and titanium tetrachloride. 5.1 g of the mesoporous material carrier C13 was added to the solution containing magnesium dichloride and titanium tetrachloride at 40° C., and the resultant mixture was stirred for 2 hours to obtain a uniform slurry to be sprayed. Then, the obtained slurry to be sprayed was introduced into a spray dryer, where it was spray dried under $N_2$ atmosphere at a gas inlet temperature of 135° C., a gas outlet temperature of 105° C., and a carrying gas flow rate of 30 L/s, to obtain a polyolefin catalyst component designated as Cat-13.

The mesoporous material carrier C13 and the polyolefin catalyst component Cat-13 were characterized through XRD, scanning electron microscope, particle size analyzer and nitrogen adsorption instrument.

Through X-ray fluorescence analysis, it was found that in the catalyst component Cat-13 obtained in this example, the magnesium content was 13.2% by weight and the titanium content was 2.95% by weight in terms of elements.

Table 13 shows the pore structure parameters of the mesoporous material carrier C13 and the polyolefin catalyst component Cat-13.

TABLE 13

| Sample | Specific surface area ($m^2$/g) | Pore volume (mL/g) | Average pore size (nm) | Particle diameter (μm) | SPAN |
|---|---|---|---|---|---|
| Carrier C13 | 588 | 1 | 4.5 | 1-8 | — |
| Catalyst component Cat-13 | 560 | 0.8 | 4.1 | 1-20 | 1.76 |

It can be seen from the data in Table 13 that after supporting the magnesium component and the titanium component on the mesoporous material carrier C13, both the specific surface area and the pore volume are reduced, indicating that the magnesium component and the titanium component enter inward the mesoporous material carrier C13.

Example 14

This example is used to illustrate the polyolefin catalyst component of the invention and its preparation.

A polyolefin catalyst component designated as Cat-14 was prepared by following the procedure as described in Example 12, except that 1.4 g of titanium trichloride was used instead of the 1.1 mL of titanium tetrachloride as a titanium component.

The mesoporous material carrier C14 and the polyolefin catalyst component Cat-14 were characterized through XRD, scanning electron microscope and nitrogen adsorption instrument.

Through X-ray fluorescence analysis, it was found that in the catalyst component Cat-14 obtained in this example, the magnesium content was 13.94% by weight and the titanium content was 2.22% by weight in terms of elements.

Table 14 shows the pore structure parameters of the mesoporous material carrier C14 and the polyolefin catalyst component Cat-14.

TABLE 14

| Sample | Specific surface area ($m^2$/g) | Pore volume (mL/g) | Average pore size (nm) | Particle diameter (μm) | SPAN |
|---|---|---|---|---|---|
| Carrier C14 | 583 | 0.9 | 5.3 | 0.9-9 | — |
| Catalyst component Cat-14 | 570 | 0.8 | 4.9 | 0.9-13 | 1.8 |

It can be seen from the data in Table 14 that after supporting the magnesium component and the titanium component on the mesoporous material carrier C14, both the specific surface area and the pore volume are reduced, indicating that the magnesium component and the titanium component enter inward the mesoporous material carrier C14.

Example 15

This example is used to illustrate the polyolefin catalyst component of the invention and its preparation, wherein the mesoporous material carrier is modified with a chlorine-containing silane.

(1) Carrier Preparation

A thermally activated mesoporous material B15 was obtained by following the procedure for preparing and thermally activating a mesoporous material as described in Example 11.

The thermally activated mesoporous material B15 was subjected to a ball milling treatment by following the procedure as described in Example 11, except that 1 g of dichlorodimethoxysilane was added together with the mesoporous material B15 into the 100 ml ball mill jar. As such, a silane-modified, ball-milled spherical mesoporous silica material carrier C15 was obtained. Samples were characterized about contact angle and RDAX energy spectrum. The characterization results showed that the contact angle of the untreated mesoporous material sample was 20° and the contact angle of the mesoporous material after ball milling was 100°. The energy spectrum analysis showed that the untreated sample contained merely Si and O, while the modified mesoporous material sample contained C, Cl, Si and O.

(2) Preparation of Polyolefin Catalyst Component

A polyolefin catalyst component designated as Cat-15 was prepared by following the procedure as described in Example 11, except that the mesoporous material carrier C15 was used instead of the mesoporous material carrier C11.

Comparative Example 5

This comparative example is used to illustrate a comparative polyolefin catalyst component and its preparation.

A polyolefin catalyst was prepared by following the procedure as described in Example 11, except that the ball milling treatment and the spray drying were not used, but after the impregnation treatment the mixture was directly filtered, washed with n-hexane 4 times, and dried at 75° C. to obtain the polyolefin catalyst component Cat-D-5.

Through X-ray fluorescence analysis, it was found that in the catalyst component Cat-D-5 obtained in this example, the magnesium content was 12.9% by weight and the titanium content was 1.6% by weight in terms of elements.

Working Example 11

This example is used to illustrate the method for preparing polyethylene by polymerizing ethylene using the polyolefin catalyst component of the present invention.

The atmosphere in a 2 L stainless steel polymerization autoclave was replaced with nitrogen three times and then with ethylene three times. 1 L of hexane, 1 mmol of triethylaluminum and about 20 mg of the catalyst component Cat-11 were added into the polymerization autoclave, then the temperature was raised to 85° C., hydrogen was added to 0.28 MPa, and then the total pressure of the system was maintained at 1.0 MPa with ethylene for polymerization. After the reaction had been carried out for 2 hours, the addition of ethylene was stopped, the temperature was lowered, and the pressure was released. A polyethylene powder was taken out for weighing, and the catalyst activity was calculated. The molecular weight distribution and melt index $MI_{2.16}$ of the polyethylene powder and the productivity of the catalyst were tested. The results are listed in Table 15.

Working Examples 12-15

Polymerizations of ethylene were carried out to prepare polyethylenes according to the method described in Working Example 11, except that the polyolefin catalyst components Cat-12 to Cat-15 were used instead of the polyolefin catalyst component Cat-11, respectively. The molecular weight distributions (Mw/Mn) and melt indexes $MI_{2.16}$ of the resulting polyethylene particulate powders and catalyst productivities are listed in Table 15.

Working Comparative Example 5

Polymerization of ethylene was carried out to prepare polyethylene according to the method described in Working Example 11, except that the polyolefin catalyst component Cat-D-5 was used instead of the polyolefin catalyst component Cat-11. The molecular weight distribution (Mw/Mn) and melt index $MI_{2.16}$ of the resulting polyethylene particulate powder and catalyst productivity are listed in Table 15.

TABLE 15

| Example No. | Polymerization powder molecular weight distribution (Mw/Mn) | Melt index $MI_{2.16}$ (g/10 min) | Catalyst Productivity (g PE/ gcat · h) |
|---|---|---|---|
| Working Example 11 | 4.6 | 1.21 | 9315 |
| Working Example 12 | 4.21 | 1.53 | 15600 |
| Working Example 13 | 4.4 | 1.32 | 12600 |
| Working Example 14 | 4.8 | 0.71 | 9120 |
| Working Example 15 | 4.01 | 1.60 | 17000 |
| Working Comparative Example5 | 6.5 | 0.09 | 1572 |

It can be seen from the results in Table 15 that the polyolefin catalyst components prepared by supporting the titanium component and the magnesium component on the mesoporous material carriers have high catalytic activities, large melt indexes of polymer powder, and narrow molecular weight distributions of polymer powder. Moreover, when the catalyst components of the present invention are used to catalyze the polymerization of ethylene, the resulting polymers have good particle morphology and excellent flowability. In addition, by utilizing the method of the present invention to prepare a supported catalyst, spherical polyolefin catalyst can be directly obtained in one step by the spray drying process, and the operation is simple and convenient.

Example 16

This example is used to illustrate a polyolefin catalyst component and its preparation.
(1) Carrier Preparation 2 g ($1.4 \times 10^{-4}$ mol) of template agent F108, 5.24 g (0.03 mol) of $K_2SO_4$ and 60 g of a hydrochloric acid solution having an equivalent concentration of 2 (2N) were stirred at 38° C. until the F108 was completely dissolved. 4.2 g (0.02 mol) of ethyl orthosilicate was added into the above solution, and the resulting mixture was stirred at 38° C. for 15 min and then allowed to crystallize at 38° C. for 24h. Then, 100 g of deionized water was added to the above mixed solution for dilution, followed by filtration, washing with deionized water 4 times, and then suction filtration, to obtain a raw powder of a hexagonal mesoporous material with a body-centered cubic Im3m structure.

The above-obtained raw powder of the hexagonal mesoporous material with body-centered cubic Im3m structure was calcined at 400° C. for 10 hours to remove the template agent, to obtain a hexagonal mesoporous material A16. Then, the template agent-removed product was thermally activated by calcining under nitrogen atmosphere at 400° C. for 10h to remove the hydroxyl group and residual moisture on the surface of the hexagonal mesoporous material, thereby obtaining thermally activated hexagonal mesoporous material B16.

10 g of the above thermally activated hexagonal mesoporous material B16 was taken into a 100 ml ball mill jar, with the material of the ball mill jar being polytetrafluoroethylene, the material of the milling balls being agate, the diameters of the milling balls ranging from 3 to 15 mm, and the number of the milling balls being 30. The ball mill jar was closed, and ball milling was performed at a temperature inside the ball mill jar of 25° C. and a rotary speed of the ball mill jar of 400 r/min for 12 hours, to obtain ball-milled hexagonal mesoporous material carrier C16.
(2) Preparation of Polyolefin Catalyst Component To a reactor equipped with a stirring device that had been purged with $N_2$ and maintained under $N_2$ atmosphere, 130 mL of tetrahydrofuran as an electron donor solvent was added. The temperature of the reactor was controlled at 30° C., 5.3 g of magnesium dichloride and 1 mL of titanium tetrachloride were quickly added when the stirring was turned on, and the system temperature was adjusted to 70° C. and maintained at that temperature for 4 hours to obtain a solution containing magnesium dichloride and titanium tetrachloride. The solution was cooled to 50° C., 6 g of the hexagonal mesoporous material carrier C16 was added to the solution containing magnesium dichloride and titanium tetrachloride, and the resultant mixture was stirred for 2 hours to obtain a uniform slurry to be sprayed. Then, the obtained slurry to be sprayed was introduced into a spray dryer, where it was spray dried under $N_2$ atmosphere at a gas inlet temperature of 140° C., a gas outlet temperature of 105° C., and a carrying gas flow rate of 30 L/s, to obtain a polyolefin catalyst component designated as Cat-16.

The hexagonal mesoporous material carrier C16 and the polyolefin catalyst component Cat-16 were characterized through XRD, scanning electron microscope, particle size analyzer and nitrogen adsorption instrument.

Through X-ray fluorescence analysis, it was found that in the catalyst component Cat-16 obtained in this example, the magnesium content was 15.54% by weight and the titanium content was 2.73% by weight in terms of elements.

Figure 10:
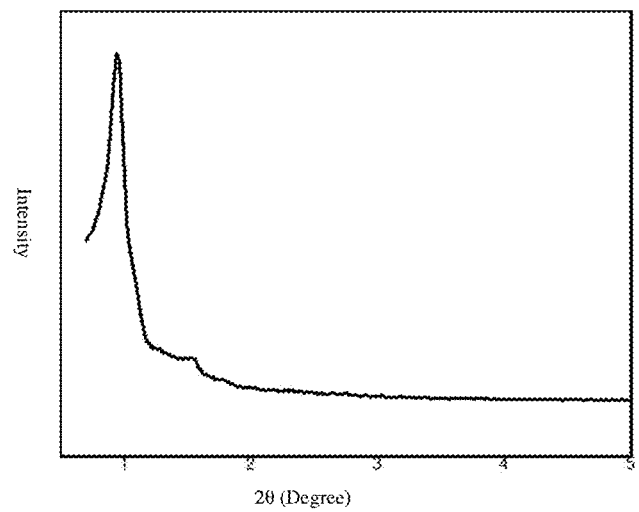
FIG. 10 is an X-ray diffraction spectrum of the hexagonal mesoporous material carrier of Example 16.

FIG. 10 is an X-ray diffraction spectrum of the hexagonal mesoporous material carrier C16, in which the abscissa is 2θ and the ordinate is intensity. It can be clearly seen from the XRD spectrum that the hexagonal mesoporous material carrier C16 has a diffraction peak (2θ=0.6°) of the (110) plane and a diffraction shoulder peak (2θ=1.2°) of the (200) plane in the small angle region that match the body-centered cubic Im3m structure. The diffraction peak of the (110) plane has a high intensity and narrow peak shape, indicating that the hexagonal mesoporous material carrier C16 has a good long-range ordered structure, which is consistent with the XRD spectrum of the FDU-6 mesoporous material reported in the literature (Chengzhong Yu, Bozhi Tian, Jie Fan, Galen D. Stucky, Dongyuan Zhao, J. Am. Chem. Soc. 2002, 124, 4556-4557). In addition, the location of the diffraction shoulder peak of the (200) plane (2θ=1.2°) is completely different from that of a hexagonal or layered structure.

Figure 11A:
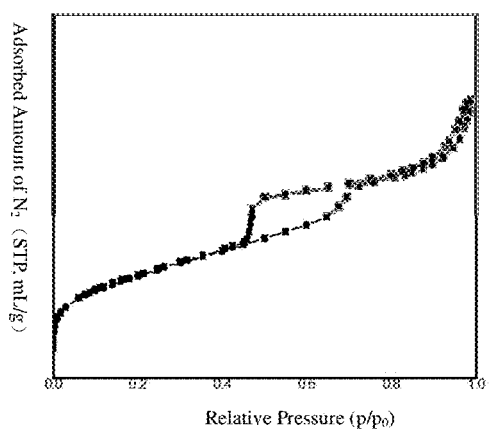
FIG. 11A is a nitrogen adsorption-desorption curve of the hexagonal mesoporous material carrier of Example 16.
Figure 11B:
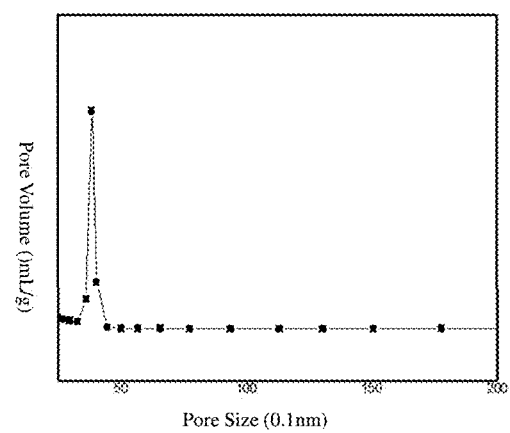
FIG. 11B is a pore size distribution curve of the hexagonal mesoporous material carrier of Example 16.

FIG. 11A is a nitrogen adsorption-desorption curve of the hexagonal mesoporous material carrier C16, in which the abscissa represents relative pressure in a unit of p/p0, and FIG. 11B is a pore size distribution curve of the hexagonal mesoporous material carrier C16, in which the abscissa represents pore size in a unit of 0.1 nm. It can be seen from the pore size distribution curve that the hexagonal mesoporous material carrier C16 has a narrow pore size distribution and the channels are very uniform. The nitrogen adsorption-desorption isotherm in FIG. 11A indicates that the hexagonal mesoporous material carrier C16 exhibits a typical IUPAC-defined type IV adsorption-desorption isotherm. The sample exhibits a H2 type hysteresis loop, proving that the hexagonal mesoporous material carrier C16 has a unique mesoporous structure of the cubic cage-like structure reported in the literature. The desorption branch in the relative partial pressure range of 0.4-0.5 also indicates that the material has a cage-like pore structure.

Figure 12:
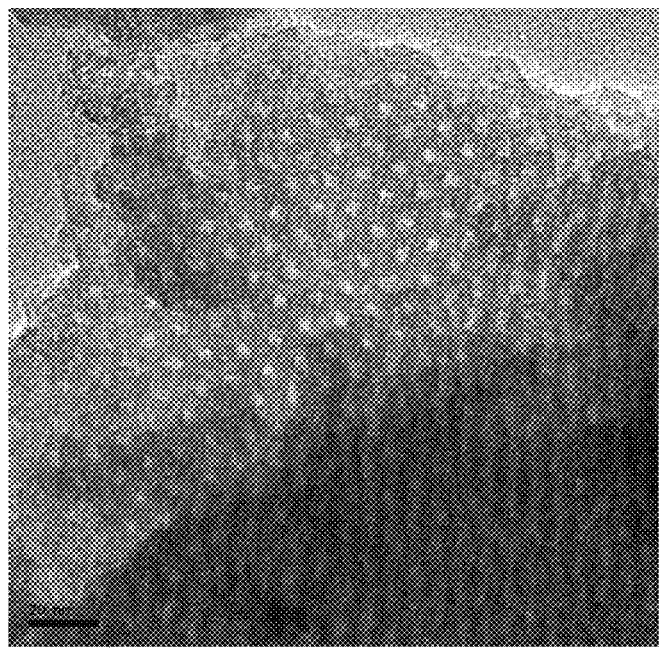
FIG. 12 is a transmission electron micrograph of the hexagonal mesoporous material carrier of Example 16.

FIG. 12 is a transmission electron micrograph of the hexagonal mesoporous material carrier C16. The shape of the pores on the (100) crystal plane of the hexagonal mesoporous material carrier C16 can be clearly seen from FIG. 12, and it can be seen from the figure that the samples all have a body-centered cubic Im3m structure.

Figure 13:
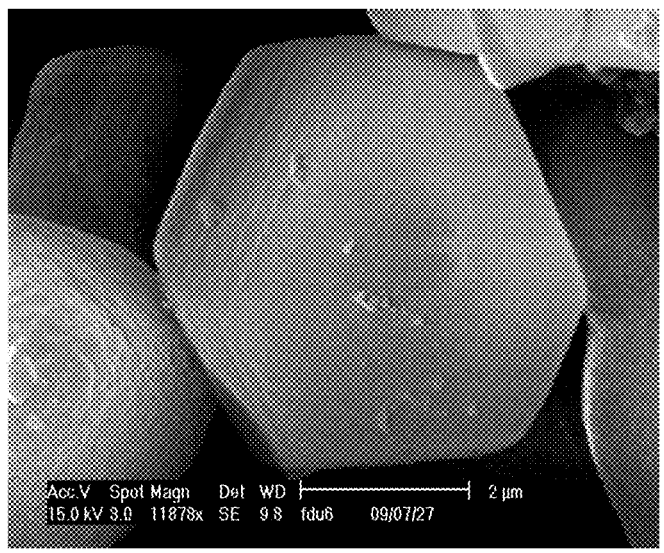
FIG. 13 is a scanning electron micrograph of the hexagonal mesoporous material carrier of Example 16.

FIG. 13 is a scanning electron micrograph of the hexagonal mesoporous material carrier C16. It can be seen from the figure that the microscopic morphology of the hexagonal mesoporous material carrier C16 is hexagonal, and the particle sizes are in the order of microns.

Figure 14:
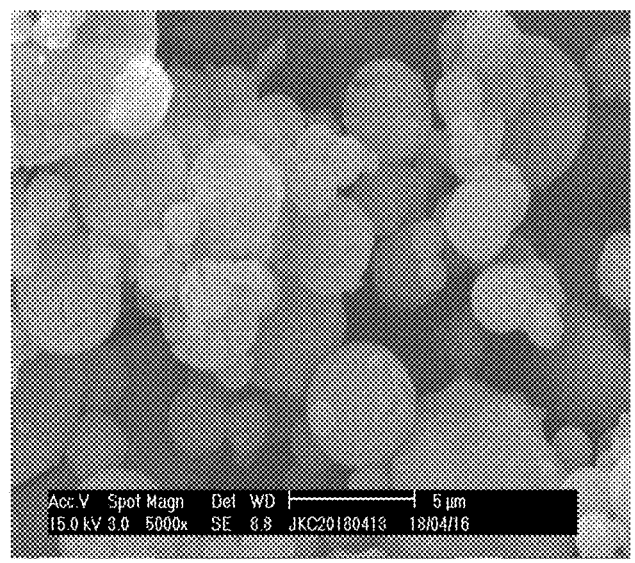
FIG. 14 is a scanning electron micrograph of the polyolefin catalyst prepared in Example 16.

FIG. 14 is a scanning electron micrograph of the polyolefin catalyst component Cat-16. It can be seen from the figure that the microscopic morphology of the polyolefin catalyst component Cat-16 is spherical and the particle sizes are in the order of microns.

Table 16 shows the pore structure parameters of the hexagonal mesoporous material carrier C16 and the polyolefin catalyst component Cat-16.

TABLE 16

| Sample | Specific surface area (m$^2$/g) | Pore volume (mL/g) | Average pore size (nm) | Particle diameter (μm) | SPAN |
|---|---|---|---|---|---|
| Carrier C16 | 509 | 1 | 7.5 | 0.8-8 | — |
| Catalyst component Cat-16 | 487 | 0.8 | 6.4 | 0.8-15 | 1.63 |

It can be seen from the data in Table 16 that after supporting the magnesium component and the titanium component on the hexagonal mesoporous material carrier C16, both the specific surface area and the pore volume are reduced, indicating that the magnesium component and the titanium component enter inward the hexagonal mesoporous material carrier C16 during the supporting.

Example 17

This example is used to illustrate the polyolefin catalyst component of the invention and its preparation.
(1) Carrier Preparation 1.46 g (1×10$^{-4}$ mol) of template agent F108, 6.96 g (0.04 mol) of $K_2SO_4$ and 60 g of a hydrochloric acid solution having an equivalent concentration of 2 (2N) were stirred at 38° C. until the F108 was completely dissolved. 3.1 g (0.015 mol) of ethyl orthosilicate was added into the above solution, and the resulting mixture was stirred at 38° C. for 15 min and then allowed to crystallize at 40° C. for 20h. Then, 100 g of deionized water was added to the above mixed solution for dilution, followed by filtration, washing with deionized water 4 times, and then suction filtration, to obtain a raw powder of a hexagonal mesoporous material with a body-centered cubic Im3m structure.

The above-obtained raw powder of the hexagonal mesoporous material with body-centered cubic Im3m structure was calcined at 600° C. for 20 hours to remove the template agent, to obtain a hexagonal mesoporous material A17. Then, the template agent-removed product was thermally activated by calcining under nitrogen atmosphere at 500° C. for 10h to remove the hydroxyl group and residual moisture of the hexagonal mesoporous material, thereby obtaining thermally activated hexagonal mesoporous material B17.

10 g of the above thermally activated hexagonal mesoporous material B17 was taken into a 100 ml ball mill jar, with the material of the ball mill jar being polytetrafluoroethylene, the material of the milling balls being agate, the diameters of the milling balls ranging from 3 to 15 mm, and the number of the milling balls being 30. The ball mill jar was closed, and ball milling was performed at a temperature inside the ball mill jar of 30° C. and a rotary speed of the ball mill jar of 300 r/min for 12 hours, to obtain ball-milled hexagonal mesoporous material carrier C17.
(2) Preparation of Polyolefin Catalyst Component To a reactor equipped with a stirring device that had been purged with $N_2$ and maintained under $N_2$ atmosphere, 130 mL of tetrahydrofuran was added. The temperature of the reactor was controlled at 30° C., 5.3 g of magnesium dichloride and 1 mL of titanium tetrachloride were quickly added when the stirring was turned on, and the system temperature was adjusted to 70° C. and maintained at that temperature for 4 hours to obtain a solution containing magnesium dichloride and titanium tetrachloride. The solution was cooled to 50° C., 3 g of the hexagonal mesoporous material carrier C17 was added to the solution containing magnesium dichloride and titanium tetrachloride, and the resultant mixture was stirred for 2 hours to obtain a uniform slurry to be sprayed. Then, the obtained slurry to be sprayed was introduced into a spray dryer, where it was spray dried under $N_2$ atmosphere at a gas inlet temperature of 150° C., a gas outlet temperature of 110° C., and a carrying gas flow rate of 40 Us, to obtain a polyolefin catalyst component designated as Cat-17.

The hexagonal mesoporous material carrier C17 and the polyolefin catalyst component Cat-17 were characterized through XRD, scanning electron microscope, particle size analyzer and nitrogen adsorption instrument.

Through X-ray fluorescence analysis, it was found that in the catalyst component Cat-17 obtained in this example, the magnesium content was 8.79% by weight and the titanium content was 3.12% by weight in terms of elements.

Table 17 shows the pore structure parameters of the hexagonal mesoporous material carrier C17 and the polyolefin catalyst Cat-17.

TABLE 17

| Sample | Specific surface area (m²/g) | Pore volume (mL/g) | Average pore size (nm) | Particle diameter (μm) | SPAN |
|---|---|---|---|---|---|
| Carrier C17 | 490 | 1.3 | 8.3 | 0.9-7 | — |
| Catalyst component Cat-17 | 455 | 1 | 7.2 | 0.9-15 | 1.67 |

It can be seen from the data in Table 17 that after supporting the magnesium component and the titanium component on the hexagonal mesoporous material carrier C17, both the specific surface area and the pore volume are reduced, indicating that the magnesium component and the titanium component enter inward the hexagonal mesoporous material carrier C17.

Example 18

This example is used to illustrate the polyolefin catalyst component of the invention and its preparation.
(1) Carrier Preparation 1.46 g ($1 \times 10^{-4}$ mol) of template agent F108, 3.48 g (0.02 mol) of $K_2SO_4$ and 60 g of a hydrochloric acid solution having an equivalent concentration of 2 (2N) were stirred at 35° C. until the F108 was completely dissolved. 3.1 g (0.015 mol) of ethyl orthosilicate was added into the above solution, and the resulting mixture was stirred at 35° C. for 15 min and then allowed to crystallize at 50° C. for 18h. Then, 100 g of deionized water was added to the above mixed solution for dilution, followed by filtration, washing with deionized water 4 times, and then suction filtration, to obtain a raw powder of a hexagonal mesoporous material with a body-centered cubic Im3m structure.

The above-obtained raw powder of the hexagonal mesoporous material with body-centered cubic Im3m structure was calcined at 550° C. for 24 hours to remove the template agent, to obtain a hexagonal mesoporous material A18. Then, the template agent-removed product was thermally activated by calcining under nitrogen atmosphere at 700° C. for 8h to remove the hydroxyl group and residual moisture of the hexagonal mesoporous material, thereby obtaining thermally activated hexagonal mesoporous material B18.

10 g of the above thermally activated hexagonal mesoporous material B18 was taken into a 100 ml ball mill jar, with the material of the ball mill jar being polytetrafluoroethylene, the material of the milling balls being agate, the diameters of the milling balls ranging from 3 to 15 mm, and the number of the milling balls being 30. The ball mill jar was closed, and ball milling was performed at a temperature inside the ball mill jar of 20° C. and a rotary speed of the ball mill jar of 550 r/min for 10 hours, to obtain ball-milled hexagonal mesoporous material carrier C18.
(2) Preparation of Polyolefin Catalyst Component To a reactor equipped with a stirring device that had been purged with $N_2$ and maintained under $N_2$ atmosphere, 130 mL of tetrahydrofuran was added. The temperature of the reactor was controlled at 40° C., 5.3 g of magnesium dichloride and 1 mL of titanium tetrachloride were quickly added when the stirring was turned on, and the system temperature was adjusted to 70° C. and maintained at that temperature for 4 hours to obtain a solution containing magnesium dichloride and titanium tetrachloride. 4.5 g of the hexagonal mesoporous material carrier C18 was added to the solution containing magnesium dichloride and titanium tetrachloride at 40° C., and the resultant mixture was stirred for 2 hours to obtain a uniform slurry to be sprayed. Then, the obtained slurry to be sprayed was introduced into a spray dryer, where it was spray dried under $N_2$ atmosphere at a gas inlet temperature of 135° C., a gas outlet temperature of 105° C., and a carrying gas flow rate of 30 L/s, to obtain a polyolefin catalyst designated as Cat-18.

The hexagonal mesoporous material carrier C18 and the polyolefin catalyst component Cat-18 were characterized through XRD, scanning electron microscope, particle size analyzer and nitrogen adsorption instrument.

Through X-ray fluorescence analysis, it was found that in the catalyst component Cat-18 obtained in this example, the magnesium content was 18.7% by weight and the titanium content was 2.85% by weight in terms of elements.

Table 18 shows the pore structure parameters of the hexagonal mesoporous material carrier C18 and the polyolefin catalyst component Cat-18.

TABLE 18

| Sample | Specific surface area (m²/g) | Pore volume (mL/g) | Average pore size (nm) | Particle diameter (μm) | SPAN |
|---|---|---|---|---|---|
| Carrier C18 | 496 | 1.1 | 8.2 | 1-6 | — |
| Catalyst component Cat-18 | 471 | 0.85 | 6.7 | 1-20 | 1.65 |

It can be seen from the data in Table 18 that after supporting the magnesium component and the titanium component on the hexagonal mesoporous material carrier C18, both the specific surface area and the pore volume are reduced, indicating that the magnesium component and the titanium component enter inward the hexagonal mesoporous material carrier C18.

Example 19

This example is used to illustrate the polyolefin catalyst component of the invention and its preparation.

A polyolefin catalyst designated as Cat-19 was prepared according to the method of Example 17, except that 1.4 g of titanium trichloride was used instead of the 1 mL of titanium tetrachloride as a titanium component.

The hexagonal mesoporous material carrier C19 and the polyolefin catalyst component Cat-19 were characterized through XRD, scanning electron microscope and nitrogen adsorption instrument.

Through X-ray fluorescence analysis, it was found that in the catalyst component Cat-19 obtained in this example, the magnesium content was 24.43% by weight and the titanium content was 1.22% by weight in terms of elements.

Table 19 shows the pore structure parameters of the hexagonal mesoporous material carrier C19 and the polyolefin catalyst component Cat-19.

TABLE 19

| Sample | Specific surface area (m$^2$/g) | Pore volume (mL/g) | Average pore size (nm) | Particle diameter (μm) | SPAN |
|---|---|---|---|---|---|
| Carrier C19 | 490 | 1.3 | 8.3 | 0.9-7 | — |
| Catalyst component Cat-19 | 468 | 0.9 | 7.1 | 0.9-15 | 1.7 |

It can be seen from the data in Table 19 that after supporting the magnesium component and the titanium component on the hexagonal mesoporous material carrier C19, both the specific surface area and the pore volume are reduced, indicating that the magnesium component and the titanium component enter inward the hexagonal mesoporous material carrier C19.

Example 20

This example is used to illustrate a polyolefin catalyst component and its preparation.
(1) Carrier Preparation 2 g (1.4×10$^{-4}$ mol) of template agent F108, 5.24 g (0.03 mol) of K$_2$SO$_4$ and 60 g of a hydrochloric acid solution having an equivalent concentration of 2 (2N) were stirred at 38° C. until the F108 was completely dissolved. 4.2 g (0.02 mol) of ethyl orthosilicate was added into the above solution, and the resulting mixture was stirred at 38° C. for 15 min and then allowed to crystallize at 38° C. for 24h. Then, 100 g of deionized water was added to the above mixed solution for dilution, followed by filtration, washing with deionized water 4 times, and then suction filtration, to obtain a raw powder of a hexagonal mesoporous material with a body-centered cubic Im3m structure.

The above-obtained raw powder of the hexagonal mesoporous material with body-centered cubic Im3m structure was calcined at 400° C. for 10 hours to remove the template agent, to obtain a hexagonal mesoporous material A20. Then, the template agent-removed product was thermally activated by calcining under nitrogen atmosphere at 400° C. for 10h to remove the hydroxyl group and residual moisture of the hexagonal mesoporous material, thereby obtaining thermally activated hexagonal mesoporous material B20.

10 g of the above thermally activated hexagonal mesoporous material B20 and 1 g of dichlorodimethoxysilane were taken into a 100 ml ball mill jar, with the material of the ball mill jar being polytetrafluoroethylene, the material of the milling balls being agate, the diameters of the milling balls ranging from 3 to 15 mm, and the number of the milling balls being 30. The ball mill jar was closed, and ball milling was performed at a temperature inside the ball mill jar of 25° C. and a rotary speed of the ball mill jar of 400 r/min for 12 hours, to obtain ball-milled hexagonal mesoporous material carrier C20. Samples were characterized about contact angle and RDAX energy spectrum. The characterization results showed that the contact angle of the untreated mesoporous material sample was 20° and the contact angle of the mesoporous material after ball milling was 100°. The energy spectrum analysis showed that the untreated sample contained merely Si and O, while the modified sample contained C, Cl, Si and O.
(2) Preparation of Polyolefin Catalyst To a reactor equipped with a stirring device that had been purged with N$_2$ and maintained under N$_2$ atmosphere, 130 mL of tetrahydrofuran as an electron donor solvent was added. The temperature of the reactor was controlled at 30° C., 5.3 g of magnesium dichloride and 1 mL of titanium tetrachloride were quickly added when the stirring was turned on, and the system temperature was adjusted to 70° C. and maintained at that temperature for 4 hours to obtain a solution containing magnesium dichloride and titanium tetrachloride. The solution was cooled to 50° C., 6 g of the hexagonal mesoporous material carrier C20 was added to the solution containing magnesium dichloride and titanium tetrachloride, and the resultant mixture was stirred for 2 hours to obtain a uniform slurry to be sprayed. Then, the obtained slurry to be sprayed was introduced into a spray dryer, where it was spray dried under N$_2$ atmosphere at a gas inlet temperature of 140° C., a gas outlet temperature of 105° C., and a carrying gas flow rate of 30 L/s, to obtain a polyolefin catalyst designated as Cat-20.

Comparative Example 6

This comparative example is used to illustrate a comparative polyolefin catalyst component and its preparation.

A polyolefin catalyst was prepared according to the method described in Example 16, except that the ball milling treatment and the spray drying were not used, but after the impregnation treatment the mixture was directly filtered, washed with n-hexane 4 times, and dried at 75° C. to obtain the polyolefin catalyst component Cat-D-6.

Through X-ray fluorescence analysis, it was found that in the catalyst component Cat-D-6 obtained in this example, the magnesium content was 13.6% by weight and the titanium content was 1.5% by weight in terms of elements.

Working Example 16

This example is used to illustrate the method for preparing polyethylene by polymerizing ethylene using the polyolefin catalyst component of the present invention.

The atmosphere in a 2 L stainless steel polymerization autoclave was replaced with nitrogen three times and then with ethylene three times. 1 L of hexane, 1 mmol of triethylaluminum and about 20 mg of the catalyst component Cat-16 were added into the 2 L stainless steel stirred autoclave, then the temperature was raised to 85° C., hydrogen was added to 0.28 MPa, and then the total pressure of the system was maintained at 1.0 MPa with ethylene for polymerization. After the reaction had been carried out for 2 hours, the addition of ethylene was stopped, the temperature was lowered, and the pressure was released. A polyethylene powder was taken out for weighing, and the catalyst activity was calculated. The bulk density and melt index MI$_{2.16}$ of the polyethylene powder and the productivity of the catalyst were tested. The results are listed in Table 20.

Working Examples 17-20

Polymerizations of ethylene were carried out to prepare polyethylenes according to the method described in Working Example 16, except that the polyolefin catalyst components Cat-17 to Cat-20 were used instead of the polyolefin catalyst component Cat-16, respectively. The molecular weight distributions and melt indexes $MI_{2.16}$ of the resulting polyethylene particulate powders and catalyst productivities are listed in Table 20.

Working Comparative Example 6

Polymerization of ethylene was carried out to prepare polyethylene according to the method described in Working Example 16, except that the polyolefin catalyst component Cat-D-6 was used instead of the polyolefin catalyst component Cat-16. The molecular weight distribution and melt index $MI_{2.16}$ of the resulting polyethylene particulate powder and catalyst productivity are listed in Table 20.

TABLE 20

| Example No. | Polymerization powder molecular weight distribution (Mw/Mn) | Melt index $MI_{2.16}$ (g/10 min) | Catalyst Productivity (g PE/gcat · h) |
|---|---|---|---|
| Working Example 16 | 4.5 | 1.21 | 6784 |
| Working Example 17 | 4.98 | 1.53 | 16200 |
| Working Example 18 | 4.8 | 1.32 | 8567 |
| Working Example 19 | 5.1 | 0.71 | 7845 |
| Working Example 20 | 3.9 | 1.33 | 20000 |
| Working Comparative Example 6 | 6.02 | 0.09 | 1173 |

It can be seen from the results in Table 20 that the polyolefin catalyst components prepared by supporting the titanium component and the magnesium component on the mesoporous material carriers have high catalytic activities, large melt indexes of polymer powder, and narrow molecular weight distributions of polymer powder. Moreover, when the catalyst components of the present invention are used to catalyze the polymerization of ethylene, the resulting polymers have good particle morphology and excellent flowability. In addition, by utilizing the method of the present invention to prepare a supported catalyst, spherical polyolefin catalyst can be directly obtained in one step by the spray drying process, and the operation is simple and convenient.

The preferred embodiments of the present invention have been described above in detail, but the present invention is not limited thereto. Within the scope of the technical concept of the present invention, a variety of simple modifications can be made to the technical solutions of the present invention, including the combinations of various technical features in any other suitable manner. These simple modifications and combinations should also be regarded as the disclosures of the present invention, and all of them fall within the protection scope of the present invention.

What is claimed is:

1. A thermally activated mesoporous material, wherein the thermally activated mesoporous material is obtained by subjecting a mesoporous material to a thermal activation treatment performed under an inert atmosphere at a temperature of 300 to 900° C. for a period of time of 3 to 48 hours, and then to a chlorine-containing silane treatment and a ball-milling treatment, wherein the chlorine-containing silane treatment and the ball-milling treatment are carried out simultaneously or separately, wherein the mesoporous material is selected from the group consisting of:
   a) an eggshell-like mesoporous material with a two-dimensional hexagonal channel structure, having a pore volume of from 0.5 to 1.5 mL/g, a specific surface area of from 100 to 500 m$^2$/g, and an average pore size of from 5 to 15 nm;
   b) a spherical mesoporous silica with a body-centered cubic structure, having a specific surface area of from 700 to 900 m$^2$/g, a pore volume of from 0.5 to 1 mL/g, and an average pore size of from 1 to 5 nm; and
   c) a hexagonal mesoporous material with a cubic cage-like channel structure, the crystal structure of which has a body-centered cubic Im3m structure, the hexagonal mesoporous material having an average pore size of from 4 to 15 nm, a specific surface area of from 450 to 550 m$^2$/g, and a pore volume of from 0.5 to 1.5 mL/g.

2. The thermally activated mesoporous material according to claim 1, wherein the thermally activated mesoporous material has a contact angle of at least 40°.

3. The thermally activated mesoporous material according to claim 1, wherein the chlorine-containing silane is selected from the group consisting of dichlorodimethoxysilane, monochlorotrimethoxysilane, dichlorodiethoxysilane, and monochlorotriethoxysilane.

4. A method for preparing a polyolefin catalyst component, comprising the steps of:
   (i) providing a thermally activated mesoporous material by subjecting a mesoporous material to a thermal activation treatment performed under an inert atmosphere at a temperature of 300 to 900° C. for a period of time of 3 to 48 hours to provide an intermediate mesoporous material, and then subjecting the intermediate mesoporous material to a chlorine-containing silane treatment and a ball-milling treatment, wherein the chlorine-containing silane treatment and the ball-milling treatment are carried out simultaneously or separately, wherein the mesoporous material is selected from:
   a) an eggshell-like mesoporous material with a two-dimensional hexagonal channel structure, having a pore volume of from 0.5 to 1.5 mL/g, a specific surface area of from 100 to 500 m$^2$/g, and an average pore size of from 5 to 15 nm;
   b) a spherical mesoporous silica with a body-centered cubic structure, having a specific surface area of from 700 to 900 m$^2$/g, a pore volume of from 0.5 to 1 mL/g, and an average pore size of from 1 to 5 nm; and
   c) a hexagonal mesoporous material with a cubic cage-like channel structure, the crystal structure of which has a body-centered cubic Im3m structure, the hexagonal mesoporous material having an average pore size of from 4 to 15 nm, a specific surface area of from 450 to 550 m$^2$/g, and a pore volume of from 0.5 to 1.5 mL/g;
   (ii) under an inert atmosphere, (iia) conducting impregnation treatment of the thermally activated mesoporous material with a solution containing a magnesium component and then with a solution containing a titanium component, (iib) conducting impregnation treatment of the thermally activated mesoporous material with a solution containing a titanium component and then with a solution containing a magnesium component, or (iic) conducting co-impregnation treatment of the thermally activated mesoporous material with a solution containing both a titanium component and a magnesium component, to obtain a slurry to be sprayed; and
   (iii) spray drying the slurry to be sprayed from step (ii), to obtain a solid polyolefin catalyst component.

5. The method according to claim 4, wherein a chlorine-containing silane used in the chlorine-containing silane treatment is selected from the group consisting of dichlorodimethoxysilane, monochlorotrimethoxysilane, dichlorodiethoxysilane, and monochlorotriethoxysilane.

6. The method according to claim 4, wherein the step of subjecting the intermediate mesoporous material to a chlorine-containing silane treatment and a ball-milling treatment is carried out by ball-milling the intermediate mesoporous material and a chlorine-containing silane together in a ball mill jar under an inert atmosphere.

7. The method according to claim 4, wherein the method further comprises, prior to step (i):
(a) mixing and contacting a template agent, trimethylpentane and tetramethoxysilane under solution conditions to obtain a solution A, and subjecting the solution A to crystallization, filtering and drying in sequence, to afford a raw powder of mesoporous material; and
(b) subjecting the raw powder of mesoporous material to a template agent-removing treatment, to provide the eggshell-like mesoporous material carrier;
wherein step (ii) is:
under an inert atmosphere, subjecting the thermally activated eggshell-like mesoporous material carrier obtained from step (i) to an impregnation treatment in a solution containing a magnesium component and a titanium component, to afford a slurry to be sprayed; and wherein step (iii) is:
subjecting the slurry to be sprayed to spray drying, to obtain a solid polyolefin catalyst component.

8. The method according to claim 7, characterized by at least one of:
in step (a), conditions for the mixing and contacting comprise a temperature of 10 to 60° C., a time of 0.2 to 100 h, and a pH of 1 to 6;
a weight ratio of the template agent to the trimethylpentane to the tetramethoxysilane is 1:(1.2-20):(0.1-15);
the template agent is triblock copolymer polyoxyethylene-polyoxypropylene-polyoxyethylene $EO_{20}PO_{70}EO_{20}$;
crystallization conditions comprise a temperature of 30 to 150° C. and a time of 4 to 72 h;
in step (b), the template agent-removing treatment comprises calcining the raw powder of the eggshell-like mesoporous material in an oxygen gas-containing atmosphere at 300 to 600° C. for 8 to 36 h;
in step (ii), impregnation conditions comprise an impregnation temperature of 25 to 100° C. and an impregnation time of 0.1 to 5 h;
the eggshell-like mesoporous material carrier, the magnesium component and the titanium component are used in such amounts that in the prepared polyolefin catalyst component, the content of the eggshell-like mesoporous material carrier ranges from 20 to 90 wt. %; the content of the magnesium component in terms of magnesium element ranges from 1 to 50 wt. %; and the content of the titanium component in terms of titanium element ranges from 1 to 50 wt. %, based on the total weight of the polyolefin catalyst component;
in step (iii), spray drying conditions comprise a nitrogen atmosphere, a gas inlet temperature of 100 to 150° C., a gas outlet temperature of 100 to 120° C., and a carrying gas flow rate of 10 to 50 L/s.

9. The method according to claim 4, wherein the method further comprises, prior to step (i):
(a) mixing and contacting a silicon source with an acid agent in the presence of a template agent, and subjecting a mixture resulting from the mixing and contacting to crystallization, filtering and drying in sequence, to afford a raw powder of mesoporous material; and
(b) subjecting the raw powder of mesoporous material to a template agent-removing treatment to provide the spherical mesoporous silica with a body-centered cubic structure; wherein step (ii) is:
under an inert atmosphere, subjecting the thermally activated spherical mesoporous material carrier from step (i) to an impregnation treatment in a solution containing a magnesium component and a titanium component, to afford a slurry to be sprayed; and wherein step (iii) is:
subjecting the slurry to be sprayed to spray drying, to obtain a solid polyolefin catalyst component.

10. The method according to claim 9, characterized by at least one of:
in step (a), a molar ratio of the template agent to the silicon source is 1:200-300;
the template agent is triblock copolymer polyoxyethylene-polyoxypropylene-polyoxyethylene $EO_{106}PO_{70}EO_{106}$;
the silicon source comprises at least one of ethyl orthosilicate, methyl orthosilicate, propyl orthosilicate, sodium orthosilicate, and silica sol;
conditions for the mixing and contacting comprise a temperature of 25 to 60° C., a time of 25 min or more, and a pH of 1 to 6;
crystallization conditions comprise a temperature of 30 to 150° C. and a time of 10 to 72 h;
in step (b), the template agent-removing treatment comprises calcining the raw powder of the mesoporous material with a body-centered cubic structure in an oxygen gas-containing atmosphere at 300 to 600° C. for 8 to 20 h;
conditions for the ball-milling treatment include a rotary speed of a ball mill jar of 100 to 800 r/min, a temperature inside the ball mill jar of 15 to 100° C., and a ball-milling time of 0.1 to 100 h;
in step (ii), conditions for the impregnation comprise an impregnation temperature of 25 to 100° C. and an impregnation time of 0.1 to 5 h;
the spherical mesoporous silica carrier, the magnesium component and the titanium component are used in such amounts that in the prepared polyolefin catalyst component, the content of the spherical mesoporous silica carrier ranges from 20 to 90 wt. %; the content of the magnesium component in terms of magnesium element ranges from 1 to 50 wt. %; and the content of the titanium component in terms of titanium element ranges from 1 to 50 wt. %, preferably from 1 to 30 wt. %, based on the total weight of the polyolefin catalyst component;
in step (iii), spray drying conditions comprise a nitrogen atmosphere, a gas inlet temperature of 100 to 150° C., a gas outlet temperature of 100 to 120° C., and a carrying gas flow rate of 10 to 50 L/s.

11. The method according to claim 4, wherein the method further comprises, prior to step (i):
(a) mixing and contacting a template agent, potassium sulfate, an acid agent and a silicon source with each other, and subjecting the resulting mixture to crystallization, filtering and drying in sequence, to afford a raw powder of hexagonal mesoporous material with a body-centered cubic Im3m structure; and
(b) subjecting the raw powder of hexagonal mesoporous material to a template agent-removing treatment to provide the hexagonal mesoporous material with a cubic cage-like channel structure; wherein step (ii) is:
under an inert atmosphere, subjecting the thermally activated hexagonal mesoporous material carrier from step (i) to an impregnation treatment in a solution containing a magnesium component and a titanium component, to afford a slurry to be sprayed; and wherein step (iii) is:

subjecting the slurry to be sprayed to spray drying, to obtain a solid polyolefin catalyst component.

12. The method according to claim 11, characterized by at least one of:
in step (a), a molar ratio of the template agent to potassium sulfate to the silicon source is 1:100-800:20-200;
the template agent is triblock copolymer polyoxyethylene-polyoxypropylene-polyoxyethylene $EO_{132}PO_{60}EO_{132}$;
the silicon source is at least one of ethyl orthosilicate, methyl orthosilicate, propyl orthosilicate, sodium orthosilicate, and silica sol;
the acid agent is at least one of hydrochloric acid, sulfuric acid, nitric acid, and hydrobromic acid;
conditions for the mixing and contacting comprise a temperature of 25 to 60° C., a time of 10 to 240 min, and a pH of 1 to 7;
crystallization conditions comprise a temperature of 25 to 60° C. and a time of 10 to 72 h;
in step (b), the template agent-removing treatment comprises calcining the raw powder of the hexagonal mesoporous material in an oxygen gas-containing atmosphere at 300 to 600° C. for 8 to 20 h;
conditions for the ball-milling treatment comprise a rotary speed of a ball mill jar of 100 to 800 r/min, a temperature inside the ball mill jar of 15 to 100° C., and a ball-milling time of 0.1 to 100 h;
in step (ii), conditions for the impregnation comprise an impregnation temperature of 25 to 100° C. and an impregnation time of 0.1 to 5 h;
the hexagonal mesoporous material carrier, the magnesium component and the titanium component are used in such amounts that in the prepared polyolefin catalyst component, the content of the hexagonal mesoporous material carrier ranges from 20 to 90 wt. %; the content of the magnesium component in terms of magnesium element ranges from 1 to 50 wt. %; and the content of the titanium component in terms of titanium element ranges from 1 to 50 wt. %, based on the total weight of the polyolefin catalyst component;
in step (iii), spray drying conditions comprise a nitrogen atmosphere, a gas inlet temperature of 100 to 150° C., a gas outlet temperature of 100 to 120° C., and a carrying gas flow rate of 10 to 50 L/s.

13. A polyolefin catalyst component comprising a thermally activated mesoporous material carrier comprising the thermally activated mesoporous material according to claim 1 as well as a magnesium component, a titanium component and optionally an electron donor component supported thereon.

14. The polyolefin catalyst component according to claim 13, wherein the mesoporous material carrier is selected from the group consisting of:
an eggshell-like mesoporous material carrier with a two-dimensional hexagonal channel structure, having a pore volume of from 0.5 to 1.5 mL/g, a specific surface area of from 100 to 500 $m^2/g$, an average pore size of from 5 to 15 nm, and an average particle size of from 0.05-5 μm;
a spherical mesoporous carrier with a body-centered cubic structure, having an average particle size of from 0.05-5 μm, a specific surface area of from 700 to 900 $m^2/g$, a pore volume of from 0.5 to 1 mL/g, and an average pore size of from 1 to 5 nm; and
a hexagonal mesoporous material carrier with a cubic cage-like channel structure, the crystal structure of which has a body-centered cubic Im3m structure, the hexagonal mesoporous material carrier having an average pore size of from 4 to 15 nm, a specific surface area of from 450 to 550 $m^2/g$, a pore volume of from 0.5 to 1.5 mL/g, and an average particle size of from 0.05-5 μm.

15. The polyolefin catalyst component according to claim 13, wherein the thermally activated mesoporous material carrier has a contact angle of at least 40°.

16. The polyolefin catalyst component according to claim 15, wherein the thermally activated mesoporous material carrier contains a chlorine-containing silane modifier attached thereon.

17. The polyolefin catalyst component according to claim 16, wherein the chlorine-containing silane modifier is selected from the group consisting of dichlorodimethoxysilane, monochlorotrimethoxysilane, dichlorodiethoxysilane, and monochlorotriethoxysilane.

18. The polyolefin catalyst component according to claim 13, wherein the content of the thermally activated mesoporous material carrier ranges from 20 to 90 wt. %; the content of magnesium element ranges from 1 to 50 wt. %; and the content of titanium element ranges from 1 to 50 wt. %, based on the total weight of the polyolefin catalyst component.

19. The polyolefin catalyst component according to claim 13, wherein
the polyolefin catalyst has a pore volume of 0.5-1 mL/g, a specific surface area of 120-300 $m^2/g$, an average pore size of 7-12 nm, an average particle size of 3-25 μm, and a particle size distribution value of 0.85-0.95;
the polyolefin catalyst has an average particle size of 3-25 μm, a specific surface area of 700-800 $m^2/g$, a pore volume of 0.5-0.8 mL/g, an average pore size of 1.5-4.5 nm, and a particle size distribution value of 0.85-0.95; or
the polyolefin catalyst has an average pore size of 4-15 nm, a specific surface area of 450-500 $m^2/g$, a pore volume of 0.5-1 mL/g, an average particle size of 0.5-20 μm, and a particle size distribution value of 1.6-1.7.

20. A method for polymerizing an olefin, comprising: a) polymerizing an olefin monomer under polymerization conditions in the presence of the polyolefin catalyst component of claim 13 and a cocatalyst, to provide a polyolefin; and b) recovering the polyolefin.

* * * * *